(12) United States Patent
Coquerel et al.

(10) Patent No.: US 11,921,062 B2
(45) Date of Patent: Mar. 5, 2024

(54) ANTI-FROSTING AND ANTI-DEW DEVICE FOR SPECTROSCOPIC MEASUREMENTS

(71) Applicant: Universite de Rouen-Normandie, Mont-Saint-Aignan (FR)

(72) Inventors: Gérard Coquerel, Mont-Saint-Aignan (FR); Simon Clevers, Rouen (FR)

(73) Assignee: Universite de Rouen-Normandie, Mont-Saint-Aignan (FR)

( * ) Notice: Subject to any disclaimer, the term of this patent is extended or adjusted under 35 U.S.C. 154(b) by 556 days.

(21) Appl. No.: 17/053,518

(22) PCT Filed: May 10, 2019

(86) PCT No.: PCT/EP2019/062038
§ 371 (c)(1),
(2) Date: Nov. 6, 2020

(87) PCT Pub. No.: WO2019/215326
PCT Pub. Date: Nov. 14, 2019

(65) Prior Publication Data
US 2021/0223191 A1 Jul. 22, 2021

(30) Foreign Application Priority Data
May 11, 2018 (EP) .................... 18305580

(51) Int. Cl.
*G01N 21/35* (2014.01)
*G01N 23/20016* (2018.01)
(Continued)

(52) U.S. Cl.
CPC .......... *G01N 23/207* (2013.01); *G01N 21/35* (2013.01); *G01N 23/20016* (2013.01);
(Continued)

(58) Field of Classification Search
CPC ................ G01N 23/207; G01N 21/35; G01N 23/20016; G01N 23/20033;
(Continued)

(56) References Cited

U.S. PATENT DOCUMENTS 3,979,325 A 9/1976 Ceccaldi et al.
4,942,134 A 7/1990 Winefordner et al.
(Continued)

FOREIGN PATENT DOCUMENTS

JP H02-24536 A1 1/1990
WO 00/23795 A1 4/2000

OTHER PUBLICATIONS

International Search Report issued in corresponding International Patent Application No. PCT/EP2019/062038 dated Jul. 19, 2019.

*Primary Examiner* — David P Porta
*Assistant Examiner* — Mamadou Faye
(74) *Attorney, Agent, or Firm* — Morgan, Lewis & Bockius LLP

(57) ABSTRACT

The present invention relates to a device for spectroscopic measurements, in particular X-ray diffraction (XRD), temperature-resolved second harmonic generation (TR-SHG) or infrared (IR) measurements, which prevents the formation of condensation (dew) or ice (frost) when carrying out spectroscopic measurements in sub-ambient temperature conditions and to a method of spectroscopic measurements with said device.

15 Claims, 14 Drawing Sheets

(51) Int. Cl.
*G01N 23/20033* (2018.01)
*G01N 23/207* (2018.01)

(52) U.S. Cl.
CPC ............... *G01N 23/20033* (2013.01); *G01N 2201/0231* (2013.01); *G01N 2201/06113* (2013.01); *G01N 2223/056* (2013.01); *G01N 2223/31* (2013.01)

(58) Field of Classification Search
CPC . G01N 2201/0231; G01N 2201/06113; G01N 2223/056; G01N 2223/31; G01N 2223/602; G01J 3/0267; G01J 3/0291; G01J 2003/1295; G01J 3/0205; G01J 3/0286

See application file for complete search history.

(56) References Cited

U.S. PATENT DOCUMENTS

| | | |
|---|---|---|
| 7,473,898 B2 | 1/2009 | Holly et al. |
| 2006/0044554 A1 | 3/2006 | Mertz et al. |
| 2014/0185768 A1* | 7/2014 | Coquerel ......... G01N 23/20033 378/80 |
| 2015/0071409 A1 | 3/2015 | Gautsch et al. |
| 2015/0377702 A1* | 12/2015 | Bojarczuk .......... G01N 21/0332 356/402 |

* cited by examiner

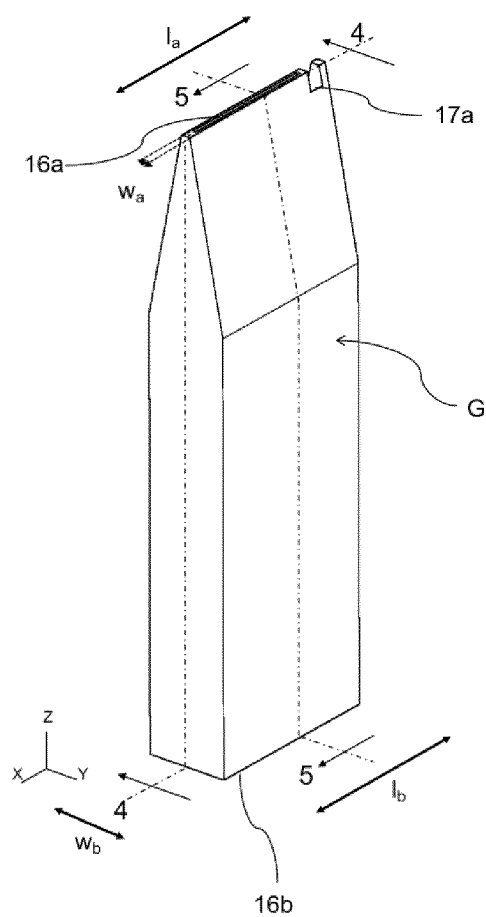
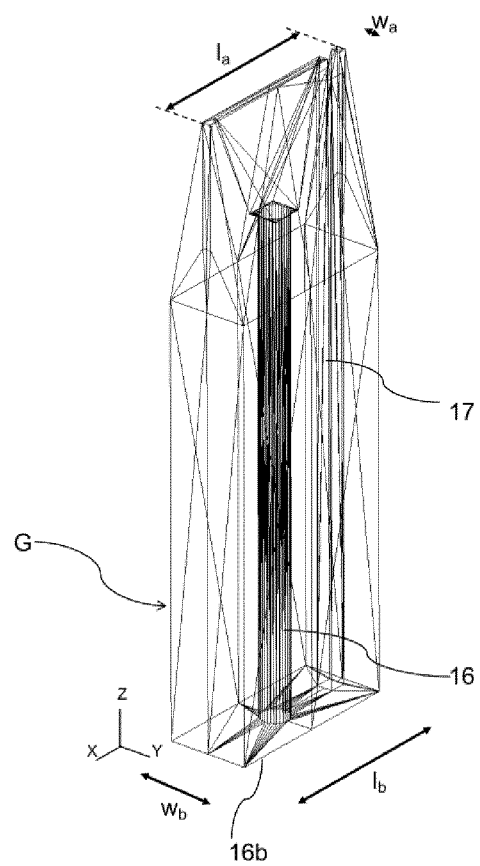
Figure 3A                                    Figure 3B

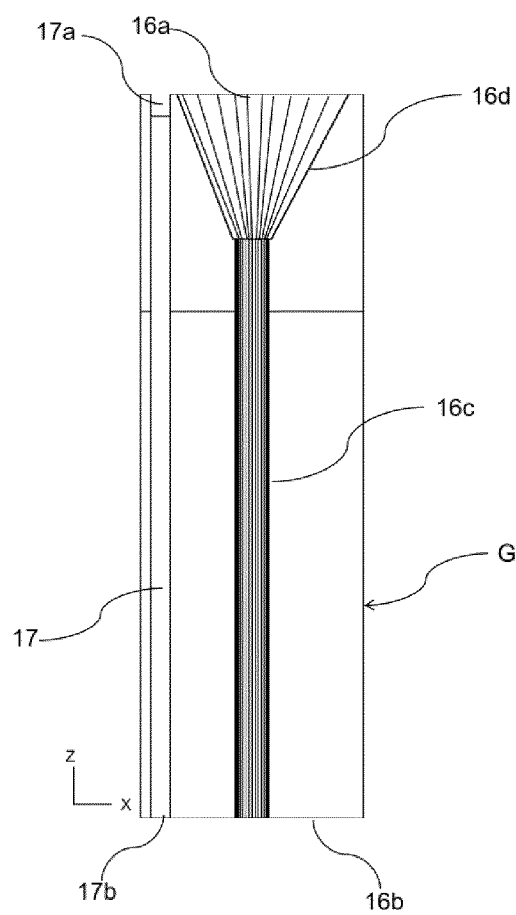 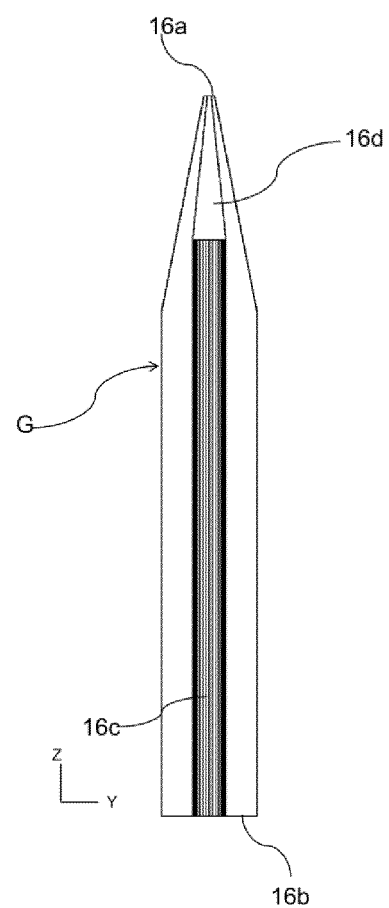
Figure 4                                          Figure 5

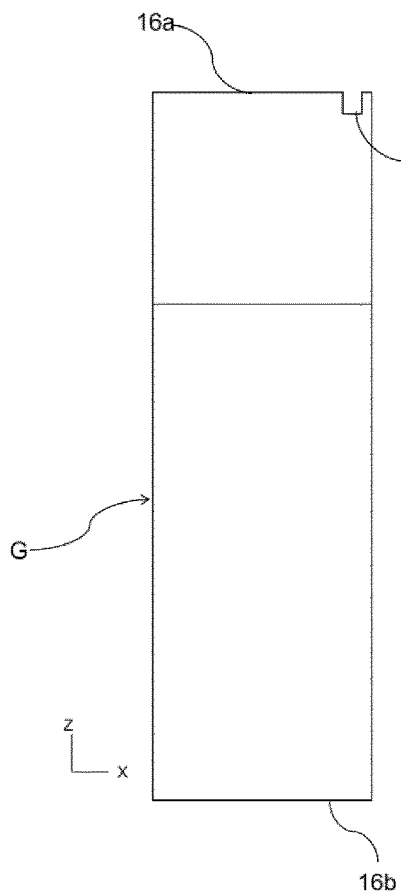
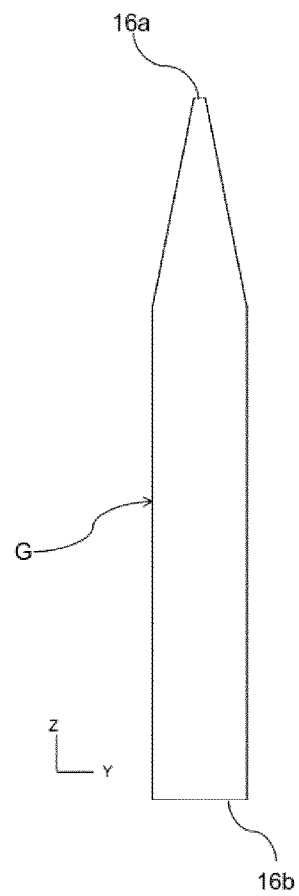
Figure 6 · Figure 7
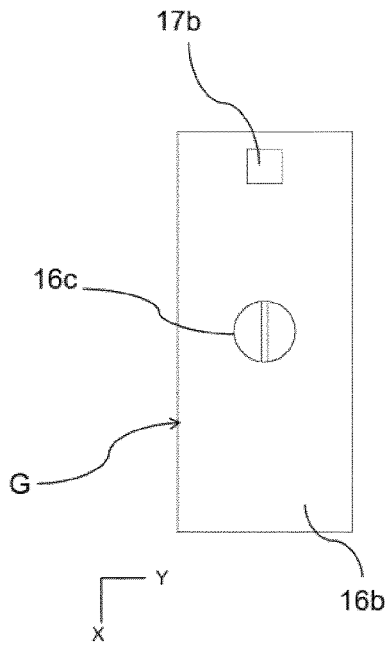
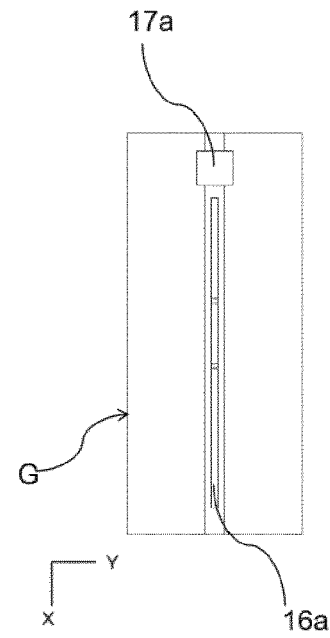
Figure 8 · Figure 9

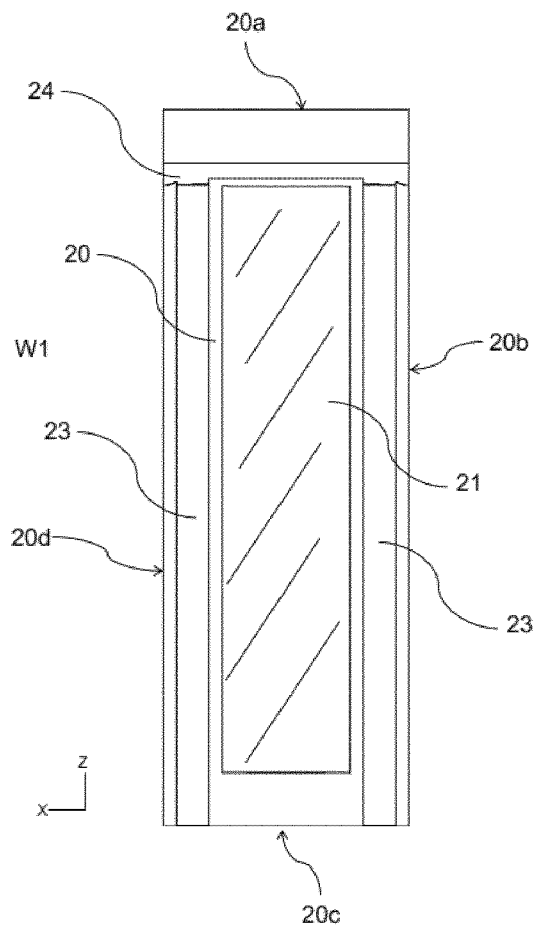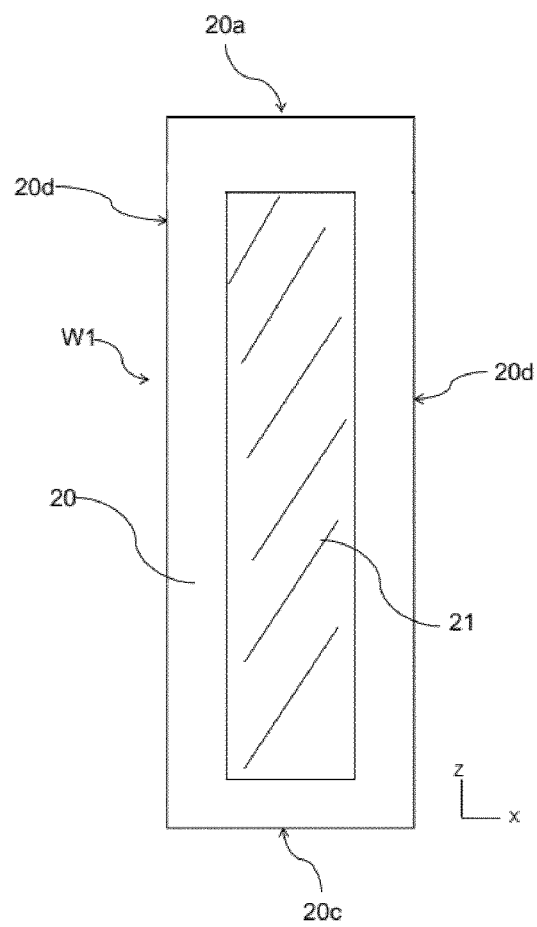
Figure 17
Figure 18
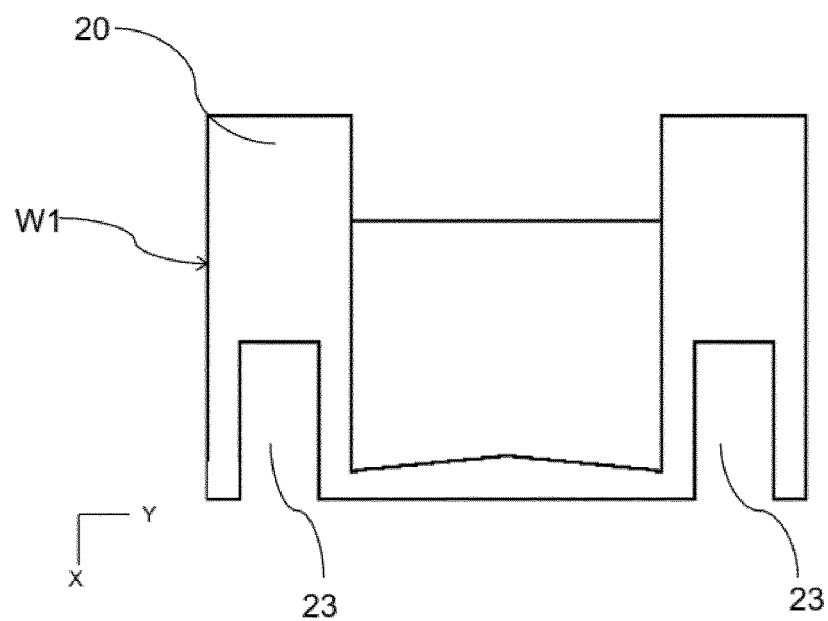
Figure 19

ANTI-FROSTING AND ANTI-DEW DEVICE FOR SPECTROSCOPIC MEASUREMENTS

TECHNICAL FIELD

The present invention relates to a device for spectroscopic measurements, in particular X-ray diffraction (XRD), temperature-resolved second harmonic generation (TR-SHG) or infrared (IR) measurements, which prevents the formation of condensation (dew) or ice (frost) when carrying out spectroscopic measurements in sub-ambient temperature conditions and to a method of spectroscopic measurements with said device.

BACKGROUND OF THE INVENTION

In order to shed light on the behavior of a crystalline material, numerous scientific analysis techniques involve temperature-dependent measurements, in particular spectroscopic analyses at sub-ambient and negative temperatures. In general, sub-ambient temperature spectroscopic measurements of crystalline samples suffer from technical problems. The major issue is related to the atmosphere surrounding the sample that is analyzed. Indeed, at sub-ambient temperatures, air moisture can cause formation of condensation (dew) or ice (frost) on the sample and elements of the spectroscopic device resulting in a possible modification of the chemical composition of the sample and the nature of the sample phase. Further, it can create measurement artefacts or even render the measurement infeasible.

Many kinds of high and low temperature chambers dedicated for spectroscopic measurements, in particular for diffraction of polycrystalline materials, are available (see, for example, US2015071409A1; U.S. Pat. Nos. 4,942,134; 3,979,325, 7,473,898). Often, vacuum environment is used. However, such systems cannot be used to study suspensions or organic molecules in crystalline state because of low vapor pressure of the samples and possible phase transition resulting by desolvation of the samples. Moreover, the temperature regulation of the sample is often ensured by a temperature sensor located in the heating/cooling element. This results in a great temperature gradient between the part of the sample in contact with the heating/cooling element and the analyzed part of the sample in contact with the surrounding atmosphere. In other words, the equilibrium time to reach the desired temperature is long. Finally, the question of frosting on the windows of such chambers is often eluded.

Although said prior art techniques are useful, they still suffer from disadvantages. First, the use of vacuum is not adequate for a majority of samples (solvates, suspensions, liquids . . . ). Second, these devices often refer to a specific apparatus or spectroscopic techniques and are consequently only appropriate to a dedicated apparatus. Finally, the temperature of the sample is generally not homogeneous because the sample is heated/cooled by conduction creating a temperature gradient in the sample and leading to cumbersome equilibration time. There thus remains a need for a device for carrying out spectroscopic measurements in sub-ambient temperature and ambient pressure conditions. Indeed, studying crystals at variable temperatures in ambient pressure conditions is necessary to fully understand a substance in its solid state and open new frontiers in Chemistry and Physics.

After extensive research, the Applicant has developed a device for spectroscopic measurements by coupling a chamber to a sample holder. The chamber comprises an internal duct to deliver a thermostatically controlled fluid in the chamber and a system to adjust the temperature in the chamber according to the temperature in the sample holder. Said device can be used to prevent the formation of condensation (dew) or ice (frost) when carrying out spectroscopic measurements in sub-ambient temperature conditions.

SUMMARY OF THE INVENTION

A first object of the invention is a device for spectroscopic measurement comprising a sample holder and a chamber;
  wherein the sample holder comprises a side wall, a bottom wall and a temperature control system to control the temperature in the sample holder;
  part of the bottom wall of the sample holder is flat and comprises a membrane that is permeable to spectroscopic radiation;
  the chamber comprises a side wall and a bottom wall and is removably coupled to the sample holder;
  the chamber comprises a first opening to deliver an incident spectroscopic beam to the membrane of the sample holder;
  the chamber comprises a feeding duct for introducing a fluid in the chamber and an output for evacuating the fluid from the chamber;
  the sample holder comprises a probe to measure the temperature in the sample holder, the chamber comprises a probe to measure the temperature in the chamber and the device comprises a system to adjust the temperature in the chamber according to the temperature in the sample holder.

Another object of the present invention is a method of spectroscopic measurement with the device of the invention, wherein a compound to be analyzed is installed in the sample holder, a spectroscopic analysis is undertaken by delivering an incident spectroscopic beam upwards to the membrane of the sample holder through the first opening of the chamber and by measuring the emergent spectroscopic beam, and a fluid thermostatically controlled to the same temperature as that of the sample holder is delivered in the chamber by the internal duct of the chamber.

Yet another object of the invention is the use of the device of the present invention to prevent the formation of condensation (dew) or ice (frost) when carrying out a spectroscopic measurement in sub-ambient temperature conditions, more particularly in sub-ambient temperature and ambient pressure conditions.

DETAILED DESCRIPTION

As used herein, the singular forms "a", "an" and "the" are intended to include the plural forms as well, unless the context clearly indicates otherwise.

Additionally, the use of "or" is intended to include "and/or", unless the context clearly indicates otherwise.

As used herein, the term "sub-ambient temperature conditions" refers to a temperature lower than the ambient temperature (i.e. lower than the temperature outside the device). If no specific measures are taken, spectroscopic measurements conducted at sub-ambient temperature can lead to the formation of condensation (dew) or ice (frost) on the spectroscopic device.

As used herein, the term "ambient pressure conditions" refers to a pressure identical to the pressure outside the device. When spectroscopic measurements are conducted in ambient pressure conditions, no vacuum is applied in the device.

Device for Spectroscopic Measurements

The device for spectroscopic measurements of the present invention comprises a sample holder and a chamber.

The sample holder of the device of the invention is adapted to contain the sample to be analyzed. In particular, the sample holder is adapted to contain a solid sample or a liquid sample, for example a powder, a solution, a suspension or an emulsion.

The sample holder comprises a side wall and a bottom wall.

At least one part of the bottom wall of the sample holder is flat and comprises a membrane that is permeable to spectroscopic radiation. As used herein, the term "membrane that is permeable to spectroscopic radiation" means a membrane that does not interfere with spectroscopic radiation passing therethrough, for example a membrane that transmits spectroscopic radiation. In one embodiment, the membrane of the sample holder is permeable to X-rays, infrared radiation, or pulsed laser beams for second harmonic generation. Examples of suitable materials that are permeable to X-rays include polyimide (for example poly(4,4'-oxydiphenylene-pyromellitimide) available as Kapton® from Dupont), polyethylene terephthalate (for example biaxially-oriented polyethylene terephthalate available as Mylar® from Dupont), silicon nitride, amorphous silicon dioxide, polyether ether ketone, beryllium, diamond and glassy carbon. Examples of suitable materials that are permeable to infrared radiation include fused silica, germanium, magnesium fluoride, N-BK7, potassium bromide, sapphire, silicon, sodium chloride, zinc selenide, zinc sulfide. Examples of suitable materials that are permeable to pulsed laser beams for second harmonic generation include diamond and amorphous silica.

Under preferential conditions of implementation of the invention, the bottom wall of the sample holder comprises a circular opening plugged by a membrane permeable to spectroscopic radiation. Said opening can have a diameter of 0.5 to 5 cm, preferably of the size of the incident spectroscopic beam. Said membrane may be fixed in such a way that it is as flat as technically possible.

The sample holder further comprises a temperature control system to control the temperature in the sample holder. As used herein, the term "temperature control system" means a system that is able to adjust the temperature of the sample placed in the sample holder to a value or a series of values, in particular to set a constant temperature (isothermal mode) and/or to apply a temperature ramp to the sample (polythermal mode). For example, the sample holder may comprise a double jacket, a heat-transfer fluid inlet port and a heat-transfer outlet port allowing the circulation of a heat-transfer fluid. Such a system is particularly adapted to control the temperature of a liquid sample.

The sample holder further comprises a probe to measure the temperature in the sample holder. In one embodiment, the probe measures the temperature of the sample contained in the sample holder, in particular the probe is located in close vicinity of the membrane of the sample holder. The probe of the sample holder is able to communicate the temperature in the sample holder to a system able to adjust the temperature in the chamber.

The sample holder may further comprise a stirrer.

The sample holder may also comprise a closing element. The closing element of the sample holder may be used to render the sample holder leak-tight to solids, liquids and optionally to gases and to reduce heat transfer with the outer atmosphere. The closing element may be removed from the sample holder during the analysis of dry powdered samples.

The sample holder may also comprise one or several ports to carry out additions of liquid or solid and/or to couple the analysis with an or more other measurement probes, such as a pH probe, a FBRM® (Focused Beam Reflectance Measurement) probe, a viscosity probe, a near infrared (NIR) probe or a humidity probe.

The chamber of the device of the invention is adapted to prevent the formation of condensation (dew) or ice (frost) on the membrane of the sample holder.

The chamber comprises a side wall and a bottom wall. The side wall of the chamber may comprise a top end and a bottom end. In particular, the size and shape of the side wall and the bottom wall of the chamber are adapted to fit the dimensions of the sample holder as well as the nature and positioning of the spectroscopic beam source. More particularly, the chamber may be cylindrical. The side wall and the bottom wall of the chamber may be made of any type of material, preferably made of an isolating material, for example poly-lactic acid (PLA). Indeed, the use of an isolating material reduces heat transfer with the outer atmosphere and improves the control of the temperature in the chamber. In one embodiment, the side wall and the bottom wall of the chamber are made of PLA and obtained by 3D printing.

The chamber is removably coupled to the sample holder. In particular, the chamber is removably coupled to the sample holder so as to form a closed chamber. As such, the chamber may be disposed beneath the sample holder. In particular, the top end of the side wall of the chamber may be in contact with the bottom wall of the sample holder. The coupling between the sample holder and the chamber may be obtained by any means known to one skilled in the art. For example, the chamber may engage with the sample holder in a sliding coupling structure or in a fitting coupling structure. In one embodiment, the chamber may comprise a fastening groove and the sample holder may comprise a fastening protrusion that is fit or slid in the fastening groove of the chamber. Alternatively, the sample holder may comprise a fastening groove and the chamber may comprise a fastening protrusion that is fit or slid in the fastening groove of the sample holder.

The chamber comprises a first opening to deliver an incident spectroscopic beam to the membrane of the sample holder. The first opening may be disposed so as to create an optical path between a spectroscopic radiation source and the membrane of the sample holder. The dimensions of the first opening depend on the type of spectroscopic measurement that is conducted and on the size of the incident spectroscopic beam. In particular, the dimensions of the first opening may be adapted to fit the angular range of the spectroscopic measurements. For example, when the spectroscopic measurement is X-ray diffraction, the measurements are carried out at different Theta angles where Theta is the angle of incidence of the X-ray beam with respect to the horizontal, and the first opening is adapted to deliver the incident X-ray beam to the membrane of the sample holder between −0.5 degrees and −70 degrees, in particular from −3 degrees to −50 degrees, in terms of a 2 Theta angular scale. The chamber may comprise two first openings, one first opening is adapted to deliver an X-ray beam and the other is adapted to deliver pulsed laser beams. Alternatively, the chamber may comprise a first opening which is adapted to deliver both an X-ray beam and a pulsed laser beam.

In one embodiment, the first opening may be obturated by a first window that comprises a frame and a membrane that is permeable to spectroscopic radiation. When the chamber comprises two first openings, each first opening may be obturated by a first window. The first window may be adapted to be removably coupled to the chamber, for example the side wall of the chamber. In particular, the first window may be adapted to be removably coupled to the chamber so as to form a closed chamber. Said coupling advantageously reduces heat transfer with the outer atmosphere and improves the control of the temperature in the chamber. The coupling between the first window and the chamber may be obtained by any means known to one skilled in the art. For example, the frame of the first window may engage with the chamber in a sliding coupling structure or in a fitting coupling structure. In one embodiment, the frame of the first window may comprise a top side, a bottom side, a left side and a right side, when looking at the membrane on the inside of the window. The left side and the right side of the frame may each comprise a fastening groove and the chamber may comprise two fastening protrusions that are fit or slid in the fastening grooves of the frame of the first window. Alternatively, the chamber may comprise two fastening grooves and the left side and the right side of the frame may each comprise a fastening protrusion that is fit or slid in the fastening grooves of the chamber.

Further, the first window may be adapted to be removably coupled to the sample holder. In particular, the first window may be adapted to be removably coupled to the sample holder so as to form a closed chamber. Said coupling advantageously reduces heat transfer with the outer atmosphere and improves the control of the temperature in the chamber and the sample holder. The coupling between the first window and the sample holder may be obtained by any means known to one skilled in the art. For example, the frame of the first window may engage with the sample holder in a sliding coupling structure or in a fitting coupling structure. In one embodiment, the frame of the first window may comprise a top side, a bottom side, a left side and a right side, when looking at the membrane on the inside of the window. The top side of the frame may comprise a fastening groove and the sample holder may comprise a fastening protrusion that is fit or slid in the fastening groove of the frame of the first window. Alternatively, the sample holder may comprise a fastening groove and the top side of the frame may comprise a fastening protrusion that is fit or slid in the fastening groove of the sample holder.

The membrane of the first window may be permeable to X-rays and/or to pulsed laser beams for second harmonic generation. When the chamber comprises two first openings, the two first windows may be made of different materials. One of the membranes of the first window may be permeable to X-rays and the other membrane of the first window may be permeable to pulsed laser beams. The membrane of the first window may be made of any material provided that it is resistant to cold temperatures, i.e. temperatures as low as −100° C., and permeable to the incident spectroscopic beam. Examples of suitable materials that are permeable to X-rays are as defined above. Examples of suitable materials that are permeable to pulsed laser beams for second harmonic generation are as defined above. The membrane may be maintained to the frame by any means known to one skilled in the art. For example, the membrane may be maintained to the frame by a double-face adhesive.

In another embodiment, the first opening may be obturated by a first waveguide. As used herein, the term "first waveguide" refers to a tubular structure that is adapted to guide an incident spectroscopic beam from a spectroscopic radiation source to the membrane of the sample holder. The first waveguide may be a first infrared waveguide. As used herein the term "first infrared waveguide" refers to a first waveguide adapted to guide an incident infrared beam.

The chamber may further comprise a second opening for collecting a reflected emergent spectroscopic beam from the chamber. The second opening may be disposed so as to create an optical path between the membrane of the sample holder and a spectroscopic detector system. The presence of the second opening depends on the type of spectroscopic measurement that is conducted. When the emergent spectroscopic beam to be analyzed is obtained by reflection of the incident spectroscopic beam by the sample, for example scattered X-ray beam or reflected infrared beam or reflected second harmonics, the emergent spectroscopic beam travels through the chamber and the chamber comprises a second opening to collect the emergent spectroscopic beam from the chamber. When the emergent spectroscopic beam to be analyzed is obtained by transmission of the incident spectroscopic beam through the sample, for example transmitted second harmonics, the emergent spectroscopic beam does not travel through the chamber and therefore, the chamber does not require a second opening. The dimensions of the second opening depend on the type of spectroscopic measurement that is conducted and on the size of the incident spectroscopic beam. In particular, the dimensions of the second opening may be adapted to fit the angular range of the spectroscopic measurements. For example, when the spectroscopic measurement is X-ray diffraction, the measurements are carried out at different Theta angles where Theta is the angle of incidence of the X-ray beam with respect to the horizontal, and the second opening is adapted to deliver the scattered X-ray beam to the X-ray detector between −0.5 degrees and −70 degrees, in particular from −3 degrees to −50 degrees, in terms of a 2 Theta angular scale. The chamber may comprise two second openings, one second opening is adapted to collect a reflected X-ray beam and the other is adapted to collect scattered second harmonics.

In one embodiment, the second opening may be obturated by a second window that comprises a frame and a membrane that is permeable to spectroscopic radiation.

The second window may be adapted to be removably coupled to the chamber, for example the side wall of the chamber. In particular, the second window may be adapted to be removably coupled to the chamber so as to form a closed chamber. Said coupling advantageously reduces heat transfer with the outer atmosphere and improves the control of the temperature in the chamber. The coupling between the second window and the chamber may be obtained by any means known to one skilled in the art. For example, the frame of the second window may engage with the chamber in a sliding coupling structure or in a fitting coupling structure. In one embodiment, the frame of the second window may comprise a top side, a bottom side, a left side and a right side, when looking at the membrane on the inside of the window. The left side and the right side of the frame may each comprise a fastening groove and the chamber may comprise two fastening protrusions that are fit or slid in the fastening grooves of the frame of the second window. Alternatively, the chamber may comprise two fastening grooves and the left side and the right side of the frame may each comprise a fastening protrusion that is fit or slid in the fastening grooves of the chamber.

Further, the second window may be adapted to be removably coupled to the sample holder. In particular, the second window may be adapted to be removably coupled to the sample holder so as to form a closed chamber. Said coupling advantageously reduces heat transfer with the outer atmosphere and improves the control of the temperature in the chamber and the sample holder. The coupling between the second window and the sample holder may be obtained by any means known to one skilled in the art. For example, the frame of the second window may engage with the sample holder in a sliding coupling structure or in a fitting coupling structure. In one embodiment, the frame of the second window may comprise a top side, a bottom side, a left side and a right side when looking at the membrane on the inside of the window. The top side of the frame may comprise a fastening groove and the sample holder may comprise a fastening protrusion that is fit or slid in the fastening groove of the frame of the second window. Alternatively, the sample holder may comprise a fastening groove and the top side of the frame may comprise a fastening protrusion that is fit or slid in the fastening groove of the sample holder.

The membrane of the second window may be permeable to X-rays. The membrane of the second window may be made of any material provided that it is resistant to cold temperatures, i.e. temperatures as low as −100° C., and permeable to the reflected spectroscopic beam. Examples of suitable materials that are permeable to X-rays are as defined above. The membrane may be maintained to the frame by any means known to one skilled in the art. For example, the membrane may be maintained to the frame by a double-face adhesive.

In another embodiment, the second opening may be obturated by a second waveguide. As used herein, the term "second waveguide" refers to a tubular structure that is adapted to guide an emergent spectroscopic beam from the membrane of the sample holder to a spectroscopic detector system. The second waveguide may be a second infrared waveguide. As used herein the term "second infrared waveguide" refers to a second waveguide adapted to guide a reflected emergent infrared beam. Alternatively, the second waveguide may be a second visible light waveguide. As used herein the term "second visible light waveguide" refers to a second waveguide adapted to guide a scattered second harmonics beam.

In another embodiment, the chamber comprises a membrane permeable to X-rays on one of the second openings and the chamber comprises a second visible light waveguide on the other second opening to guide scattered second harmonic waves.

The chamber comprises a feeding duct for introducing a fluid in the chamber and an output for evacuating the fluid from the chamber. The fluid introduced in the chamber may a thermostatically controlled fluid, in particular a thermostatically controlled gas, more particularly a thermostatically controlled dry gas, even more particularly a thermostatically controlled dry nitrogen or carbon dioxide. In one embodiment, the feeding duct is inserted in the chamber through an opening in the bottom wall of the chamber. The feeding duct may be connected to a temperature-controlled fluid generator, in particular a temperature-controlled gas generator, more particularly a temperature-controlled dry gas generator, even more particularly a temperature-controlled dry nitrogen or carbon dioxide generator. The temperature-controlled fluid generator is able to adjust the temperature of the fluid delivered in the chamber to a value or a series of values, in particular to set a constant temperature (isothermal mode) and/or to apply a temperature gradient (polythermal mode). In particular, the feeding duct may be connected to the temperature-controlled fluid generator via a tube, such as a vacuum insulated line. Preferably, the fluid introduced in the chamber has the same temperature as that measured in the sample holder. As used herein, the "term same temperature" refers to a temperature that has a maximum temperature difference of less than +/−5° C., in particular less than +/−2° C., more particularly less than +/−1° C., with respect to the reference temperature. Even more preferably, the fluid introduced in the chamber is a dry gas that has the same temperature as that measured in the sample holder. Indeed, the introduction of a thermostatically controlled dry atmosphere inside the chamber prevents the formation of condensation (dew) or ice (frost) on the membrane of the sample holder when the temperature in the sample holder is in sub-ambient temperatures conditions.

In one embodiment, the feeding duct comprises a base and a top end and the top end is positioned in close vicinity of the membrane of the sample holder. As such, the height of the feeding duct depends on the height of the side wall of the chamber. The feeding duct may be centered on the sample to be analyzed. In particular, the base and the top end of the feeding duct may have a rectangular cross-section, in particular the cross section may be a rectangle having a length and a width wherein the length is the side having the longest dimension. Further, the cross-sectional area of the top end may be less than the cross-sectional area of the base. As such, the rectangular cross sections of the base and the top end of the feeding duct may have the same length but the width of the rectangular cross-section of the top end may be less than that of the base. More particularly, the cross-sectional area of the top end of the feeding duct depends on the surface area of the membrane of the sample holder.

Even more particularly, the feeding duct is designed to not interfere with the incident spectroscopic beam.

Further, the feeding duct is advantageously adapted to limit specular diffusion of the incident spectroscopic beam, in particular when the angle of the incident spectroscopic beam with respect to the horizontal is low. More particularly, the feeding duct is adapted to be used as a knife-edge. As such, the width of the rectangular cross-section of the top end of the feeding duct may be placed in a direction parallel to the incident spectroscopic beam. Further, the width of the rectangular cross-section of the top end of the feeding duct may be relatively thin, for example from 0.01 to 1 cm.

The feeding duct may comprise an inner channel. The inner channel may be used to deliver the thermostatically controlled fluid to the chamber. Further, the inner channel may comprise an enlargement at the top end of the feeding duct.

In one embodiment, the output is adapted to adjust the pressure inside the chamber slightly above the ambient pressure (1.01 to 1.05 atm) so as to force the thermostatically controlled dry gas to travel through the chamber. In particular, the output may be a valve, for example a valve placed on the bottom wall of the chamber. The output may also be constituted by the one or more openings in the chamber, for example the first opening and/or the second opening, which may not be completely leak-tight when the first window and/or the second window are removably coupled thereon.

The chamber comprises a temperature probe to measure the temperature in the chamber. The temperature probe of the chamber is able to communicate the temperature in the chamber to a system able to adjust the temperature in the chamber. In one embodiment, the temperature probe of the chamber may be disposed so as to measure the temperature in close vicinity of the sample membrane. Said positioning advantageously provides for an accurate control of the temperature in the chamber according to the temperature in the sample holder. In particular, the temperature probe of the chamber may be maintained by the feeding duct. As such, the feeding duct may comprise a temperature probe channel in which the temperature probe is inserted and the top end of the feeding duct may comprise a recess to house the temperature probing end. The temperature probe may be a PT100 or Pt1000 temperature probe. The temperature probe may be connected to the temperature-controlled fluid generator, for example with a feedback loop.

When the chamber comprises a first window or a first waveguide, the chamber may further comprise a first nozzle to project a fluid on the outside of the first window or on a part of the first waveguide that is outside the chamber. Also, when the chamber comprises a second window or a second waveguide, the chamber may further comprise a second nozzle to project a fluid on the outside of the second window or on a part of the second waveguide that is outside the chamber. When the spectroscopic measurements are conducted in sub-ambient temperature conditions, the first and second nozzles advantageously prevent the formation of condensation (dew) or ice (frost) on the outside of the first and second window or on part of the first and second waveguide that is outside the chamber.

When the chamber comprises a first window, the first nozzle may be removably coupled to the outside of the first window. As such, the first nozzle may comprise a frame that can be removably coupled to the first window, a fluid inlet and a nozzle head. When the chamber comprises a second window, the second nozzle may be removably coupled to the outside of the second window. As such, the second nozzle may comprise a frame that can be removably coupled to the second window, a fluid inlet and a nozzle head.

The coupling between the first nozzle and the first window may be obtained by any means known to one skilled in the art. For example, the frame of the first window may engage with the first nozzle in a sliding coupling structure or in a fitting coupling structure as described herein above. The coupling between the second nozzle and the second window may be obtained by any means known to one skilled in the art. For example, the frame of the second window may engage with the second nozzle in a sliding coupling structure or in a fitting coupling structure as described herein above.

The first nozzle, respectively the second nozzle, is adapted to maintain the temperature of the first window, respectively the second window, above the dew point of the air outside the device. The first nozzle and the second nozzle may deliver a fluid having a temperature that is higher than the temperature in the chamber, in particular a fluid having a temperature of 5 to 50° C., more particularly a fluid having a temperature higher than the dew point of the air outside the device.

The flow of the fluid may be regulated with a fluid flow controller, such as a solenoid valve. Further, the flow of the fluid may be adapted to the temperature in the chamber; for example, when the temperature in the chamber decreases, the flow of the fluid may be increased. The first and second nozzles may be connected to the fluid flow controller via a fluid tube. In particular, the fluid tube may be connected to the fluid inlet of the first and second nozzles.

The chamber may further comprise a third opening for introducing a camera or a microscope in the chamber. In particular, the third opening may be an inclined through-hole in the side wall of the chamber. More particularly, the inclination of the third opening is adapted to have the sample in the field of view of the camera or the microscope.

The device further comprises a system to adjust the temperature in the chamber according to the temperature in the sample holder. Said system may be computer-controlled. In particular, said system may be connected to the temperature probe in the chamber, to the temperature probe in the sample holder and to the temperature-controlled fluid generator that controls the temperature of the fluid delivered inside the chamber. Said system may further be connected to the fluid flow controller that controls the temperature of the fluid delivered to the outside of the first window and second window, if any.

The device may further comprise a spectroscopic radiation source and a spectroscopic detector system.

When the device is used to measure X-ray diffraction, the spectroscopic radiation source is an X-ray generator placed in a diffractometer provided with a goniometer installed so as to direct an incident X-ray beam from underneath the sample holder toward the sample holder membrane through the first opening and the spectroscopic detector system is installed underneath the sample holder so as to collect the scattered X-ray beam through the second opening. In particular, the goniometer of the X-ray diffractometer directs the incident X-ray beam toward the sample holder membrane using a "–Theta/–Theta" based geometry with respect to the horizontal, where Theta is the angle of incidence of the X-ray beam with respect to the horizontal. Such geometry is also referred to as inverted reflection based geometry. The ports present on the cover of the crystallization tracking device make it possible to carry out additions of liquid or solid and also make it possible to couple the analysis with other measurement probes (pH, temperature, NIR, FBRM etc.).

When the device is used to measure infrared radiation, the spectroscopic radiation source is an infrared light source installed so as to direct an incident infrared beam from underneath the sample holder toward the sample holder membrane and the spectroscopic detector system is installed underneath the sample holder so as to measure the reflected infrared beam.

When the device is used to measure TR-SHG, the spectroscopic radiation source is a pulsed laser, for example a nanosecond laser with 10 Hz cadence, installed so as to direct pulsed laser beams for second harmonic generation from underneath the sample holder toward the sample holder membrane and the spectroscopic detector system is installed above the sample holder so as to measure the transmitted second harmonics or the spectroscopic detector system is installed below the sample holder so as to measure the reflected second harmonics.

When the device is used to measure X-ray diffraction and TR-SHG simultaneously, it comprises both spectroscopic sources and both spectroscopic detector systems as described above.

Method of Spectroscopic Measurement

The method of spectroscopic measurement according to the invention is carried out with the device of the invention. The embodiments of the device described herein above equally apply to the method of the invention.

In the method of the invention, a compound to be analyzed is installed in the sample holder of the device. In one embodiment, the sample to be analyzed is a solid sample or a liquid sample, for example a powder, a solution, a suspension or an emulsion. The method of the invention is particularly well suited to monitor the phase changes of a sample that is liquid in ambient temperature conditions and undergoes solid phase transitions in sub-ambient temperature conditions. For example, the method can be used to monitor crystallizations, formation of co-crystals, formation of inclusion compounds, exchanges of solvents within crystallized phases, the evolution of amorphous forms into crystalline phases, polymorphic transitions or other transitions involving at least a solid phase such as desolvation-resolvation, peritectoid transition, eutectoid transition, eutectic transition, and peritectic transition.

In the method of the invention, a spectroscopic analysis is undertaken by delivering an incident spectroscopic beam upwards to the membrane of the sample holder through the first opening of the chamber and by measuring the emergent spectroscopic beam. The spectroscopic analysis may be an X-ray diffraction analysis, a temperature-resolved second harmonic generation analysis and/or an infrared analysis. Several analyses may be performed simultaneously. For example, the method of the invention may involve an X-ray diffraction analysis and a temperature-resolved second harmonic generation analysis simultaneously.

In the method of the invention, a fluid thermostatically controlled to the same temperature as that of the sample holder is delivered in the chamber by the feeding duct of the chamber. In particular, the thermostatically controlled fluid may be projected in close vicinity of the membrane of the sample holder.

In one embodiment, the spectroscopic analysis may be carried out in sub-ambient temperature conditions. As such, the temperature of the sample holder during the spectroscopic analysis may reach a temperature lower than the temperature outside of the device, in particular the temperature of the sample holder during the spectroscopic analysis may be set to reach a value or a series of values within the range of −100° C. to 10° C., more particularly within the range of −90° C. to 0° C. In particular, the spectroscopic analysis may be carried out in sub-ambient temperature and ambient pressure conditions.

The thermostatically controlled fluid delivered in the chamber may be a gas, in particular a dry gas, more particularly dry nitrogen or dry carbon dioxide. As used herein the term "dry gas" refers to a gas that exhibits a dew point that is lower than the (lowest desired) temperature in the chamber.

The thermostatically controlled fluid may be generated by a temperature-controlled fluid generator, in particular a temperature-controlled gas generator, more particularly a temperature-controlled dry gas generator, even more particularly a temperature-controlled dry nitrogen or carbon dioxide generator. The temperature of the thermostatically controlled fluid may be adjusted by a system, such as a computer-controlled system, connected to a temperature probe in the chamber, to a temperature probe in the sample holder and to the temperature-controlled fluid generator.

In one embodiment, the incident spectroscopic beam is delivered through the first opening of the chamber and said first opening is obturated by a first window or a first waveguide. When the spectroscopic analysis is carried out in sub-ambient temperature conditions, condensation (dew) or ice (frost) may appear on the outside of the first window or on a part of the first waveguide that is outside the chamber. To prevent the formation of condensation (dew) or ice (frost), a fluid may be delivered to the outside of the first window or to a part of the first waveguide that is outside the chamber by a first nozzle. In particular, the temperature of said fluid may be at a temperature higher than the temperature in the chamber, more particularly from 5 to 50° C., even more particularly a fluid having a temperature higher than the dew point of the air outside the device.

Further, the emergent spectroscopic beam may be delivered through a second opening of the chamber and said second opening may be obturated by a second window or a second waveguide. When the spectroscopic analysis is carried out in sub-ambient temperature conditions, condensation (dew) or ice (frost) may appear on the outside of the second window or on a part of the second waveguide that is outside the chamber. To prevent the formation of condensation (dew) or ice (frost), a fluid may be delivered to the outside of the second window or to a part of the second waveguide that is outside the chamber by a second nozzle. In particular, the temperature of said fluid may be at a temperature higher than the temperature in the chamber, more particularly from 5 to 50° C., even more particularly a fluid having a temperature higher than the dew point of the air outside the device.

In one embodiment, the spectroscopic analysis is an X-ray diffraction analysis, the membrane of the sample holder is permeable to X-rays, the incident spectroscopic beam is an incident X-ray beam, the emergent spectroscopic beam is a beam of scattered X-rays and the chamber of the device comprises a second opening through which the beam of scattered X-rays is collected. In particular, the incident X-ray beam may be delivered by a diffractometer provided with a goniometer installed so as to direct an incident X-ray beam from underneath the sample holder through the first opening toward the sample holder membrane and the beam of scattered X-rays may be collected by an X-ray detector system installed underneath the sample holder through the second opening. In particular, the goniometer of the X-ray diffractometer directs the beam of X-rays toward the sample holder membrane using a "−Theta/−Theta" based geometry with respect to the horizontal, where Theta is the angle of incidence of the X-ray beam with respect to the horizontal. During the spectroscopic analysis, the angle of incidence of the incident X-ray beam is made to vary between −0.5 degrees and −70 degrees, in particular from −3 degrees to −50 degrees, in terms of a 2 Theta angular scale. The first opening of the chamber may be obturated by a first window that comprises a frame and a membrane that is permeable to X-rays. The second opening of the chamber may be obturated by a second window that comprises a frame and a membrane that is permeable to X-rays. A fluid thermostatically controlled to the same temperature as that of the sample holder is delivered in the chamber by the feeding duct of the chamber. When the spectroscopic analysis is carried out in sub-ambient temperature conditions, a fluid having a temperature higher than the dew point of the air outside the device may be delivered to the outside of the first window by a first nozzle and a fluid having a temperature higher than the dew point of the air outside the device may be delivered on the outside of the second window by a second nozzle.

In another embodiment, the spectroscopic analysis is an infrared analysis, the membrane of the sample holder is permeable to infrared radiation, the incident spectroscopic beam is an incident infrared beam, the emergent spectroscopic beam is a reflected infrared beam and the chamber of the device comprises a second opening through which the reflected infrared beam is collected. In particular, the spectroscopic radiation source may be an infrared light source installed so as to direct an incident infrared beam from underneath the sample holder toward the sample holder membrane and the reflected infrared beam may be collected by an infrared detector system installed underneath the sample holder. The first opening of the chamber may be obturated by a first infrared waveguide that guides the incident infrared beam from the infrared light source to the sample holder membrane. The second opening of the chamber may be obturated by a second infrared waveguide that guides the reflected infrared beam from the sample holder membrane to the infrared detector system. A fluid thermostatically controlled to the same temperature as that of the sample holder is delivered in the chamber by the feeding duct of the chamber. When the spectroscopic analysis is carried out in sub-ambient temperature conditions, a fluid at a temperature higher than the temperature in the chamber may be delivered to part of first infrared waveguide that is outside the chamber by a first nozzle and a fluid at a temperature higher than the temperature in the chamber may be delivered to part of second infrared waveguide that is outside the chamber by a second nozzle.

In yet another embodiment, the spectroscopic analysis is a TR-SHG analysis, the membrane of the sample holder is permeable to pulsed laser beams for second harmonic generation, the incident spectroscopic beam is pulsed laser beams for second harmonic generation and the emergent spectroscopic beam is transmitted or reflected second harmonics. In particular, the spectroscopic radiation source may be a pulsed laser installed so as to direct pulsed laser beams for second harmonic generation from underneath the sample holder toward the sample holder membrane and the transmitted second harmonics are collected by a spectroscopic detector system installed above the sample holder or the reflected second harmonics are collected by a spectroscopic detector system installed below the sample holder. The first opening of the chamber may be obturated by a first window that comprises a frame and a membrane that is permeable to pulsed laser beams for second harmonic generation. When the emergent spectroscopic beam to be analyzed is a scattered second harmonic beam, the emergent spectroscopic beam travels through the chamber and the chamber comprises a second opening to collect the emergent spectroscopic beam from the chamber. A fluid thermostatically controlled to the same temperature as that of the sample holder is delivered in the chamber by the feeding duct of the chamber. When the spectroscopic analysis is carried out in sub-ambient temperature conditions, a fluid at a temperature higher than the dew point of the air outside the device may be delivered to the outside of the first window by a first nozzle.

In yet another embodiment, two spectroscopic analyses are carried out simultaneously, an X-ray diffraction analysis and a TR-SHG analysis. The sample holder comprises two first openings, one of the first openings is obturated with a membrane that is permeable to X-rays and the other first openings is obturated with a membrane that is permeable to pulsed laser beams for second harmonic generation. Two incident spectroscopic beams are directed towards the sample holder, an incident X-ray beam is delivered to the membrane that is permeable to X-rays and pulsed laser beams for second harmonic generation are delivered to the membrane that is permeable to pulsed laser beams. Two emergent spectroscopic beams are collected, a beam of scattered X-rays is collected through a second opening of the chamber by an X-ray detector system installed underneath the sample holder and the transmitted or reflected second harmonics are respectively collected above or below the sample holder by a spectroscopic detector system. Two spectroscopic radiation sources are used, the incident X-ray beam is delivered by a diffractometer provided with a goniometer installed so as to direct the incident X-ray beam from underneath the sample holder through the first opening obturated with a membrane that is permeable to X-rays and the pulsed laser beams are delivered by a pulsed laser installed so as to direct pulsed laser beams from underneath the sample holder through the first opening obturated with a membrane that is permeable to pulsed laser beams. A fluid thermostatically controlled to the same temperature as that of the sample holder is delivered in the chamber by the feeding duct of the chamber. When the spectroscopic analysis is carried out in sub-ambient temperature conditions, a fluid at a temperature higher than the dew point of the air outside the device may be delivered to the outside of the first window by a first nozzle.

Use of the Device and Method for Spectroscopic Measurements

The device of the invention may be used to prevent the formation of condensation (dew) or ice (frost) when carrying out a spectroscopic measurement in sub-ambient temperature conditions, more particularly in sub-ambient temperature and ambient pressure conditions.

The method of the invention may be used to monitor or track a crystallization process.

The method of the invention may be used to track a polymorphic transition or solvation or desolvation evolution, the formation or decomposition of a salt or a co-crystal, the crystallization of a host-guest association.

The method of the invention may be used to study the stability of a solid phase in a liquid, gas, gel, emulsion or amorphous solid matrix.

The method of the invention may be used to search for metastable phases or reaction intermediaries.

The method of the invention may be used to study the evolution of a salt as a function of pH.

The method of the invention may be used to study the evolution of a crystallized phase in a solvent as a function of the composition in solvent and/or in constituents of all sorts liable to give rise to the formation of a solid.

DESCRIPTION OF FIGURES

The invention may best be understood by referring to the following description and accompanying drawings used to illustrate embodiments of the invention.

FIG. 3A and FIG. 3B respectively show a perspective view and a wireframe perspective view of the feeding duct of FIG. 1;

FIG. 4 shows a section of the feeding duct along the line 4-4 of FIG. 3A looking in the direction of the arrows;

FIG. 5 shows a section of the feeding duct along the line 5-5 of FIG. 3A looking in the direction of the arrows;

FIGS. 6-9 respectively show a left view, a front view, a bottom view and a top view of the feeding duct of FIG. 1;

FIGS. 15-19 respectively show a perspective view, a front view, a right view, a left view and a bottom view of the first window or the second window of the chamber of FIG. 1;

Figure 1:
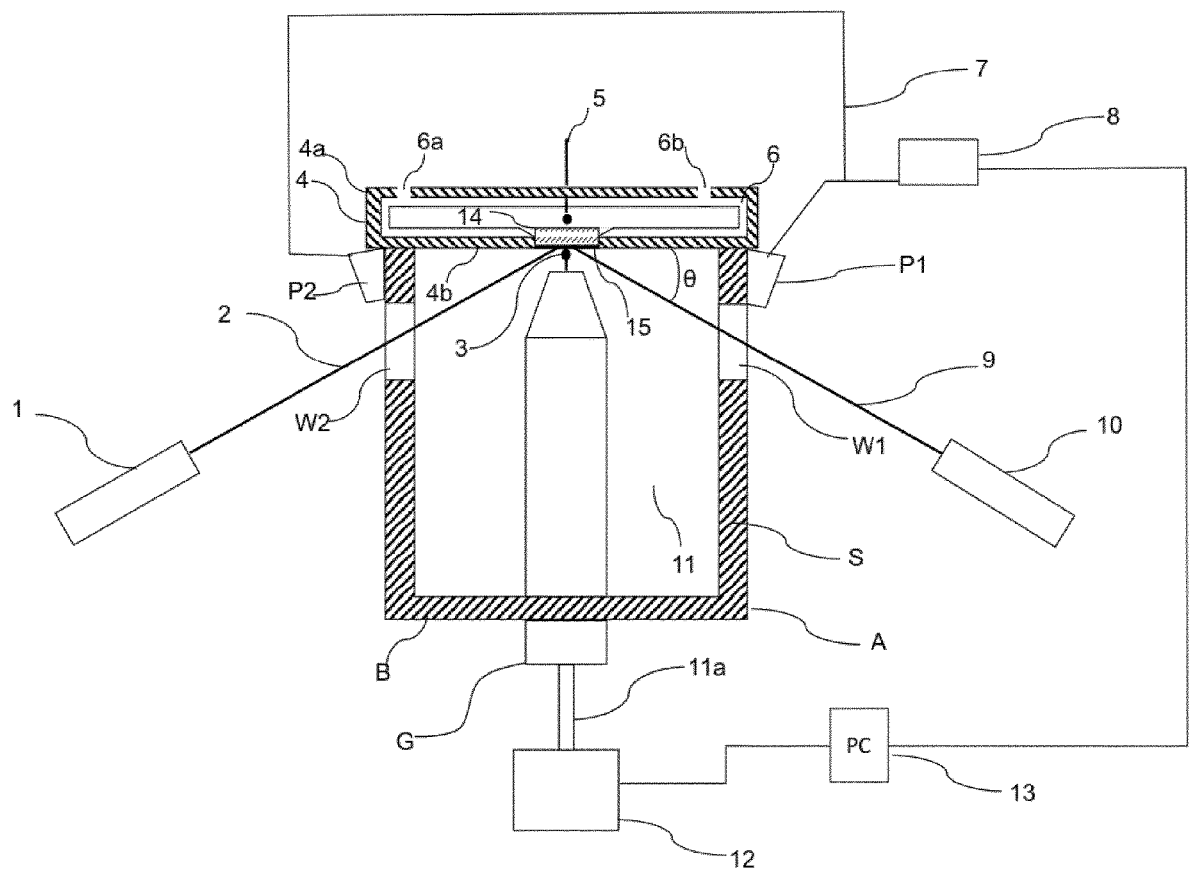
FIG. 1 represents an overall diagrammatic view of the device according to one embodiment of the invention.

In the Figures, the following reference numerals are used
A: chamber;
S: side wall of chamber;
S1: top end of side wall
S2: bottom end of side wall
B: bottom wall of chamber;
P1: first nozzle;
P2: second nozzle;
W1: first window;
W2: second window;
G: feeding duct;
O: gas output;
1: X-ray detector;
1a: optical fiber probe;
2: scattered X-ray beam;
2a: scattered second harmonic beam;
3: temperature probe of chamber;
4: sample holder;
4a: side wall of sample holder;
4b: bottom wall of sample holder;
5: temperature probe of sample holder;
6: double-jacket of sample holder;
6a: inlet of heat-transfer fluid;
6b: outlet of heat-transfer fluid;
7: gas tube;
8: air flow controller;
9: incident X-ray beam;
10: X-ray source;
10a: infrared LASER source;
11: thermostatically controlled dry gas atmosphere;
11a: tube between generator and feeding duct;
12: temperature-controlled dry gas generator;
13: computer;
14: sample;
15: sample holder membrane;
16a: top end of feeding duct;
$l_a$: length of top end of feeding duct;
$w_a$: width of top end of feeding duct;
16b: base of feeding duct;
$l_b$: length of base of feeding duct;
$w_b$: width of base of feeding duct;
16c: inner channel of feeding duct;
16d: enlargement of inner channel of feeding duct;
17: temperature probe channel of feeding duct;
17a: recess for probing end of temperature probe;
17b: temperature probe channel input;
18: camera channel gateway;
19: opening for feeding duct;
20: window frame;
20a: top side of frame;
20b: right side of frame;
20c: bottom side of frame;
20d: left side of frame;
21: window membrane;
22: fastening protrusion of side wall;
23: fastening groove of left side and right side of frame;
24: fastening groove of top side of frame;
25: nozzle frame;
26: air entrance of nozzle;
27: nozzle head;
28: spectrometer.

The diagrammatic view of FIG. 1 shows an embodiment of a device according to one embodiment of the invention for measuring X-ray diffraction. The device comprises a chamber A and a sample holder 4.

Figure 2A:
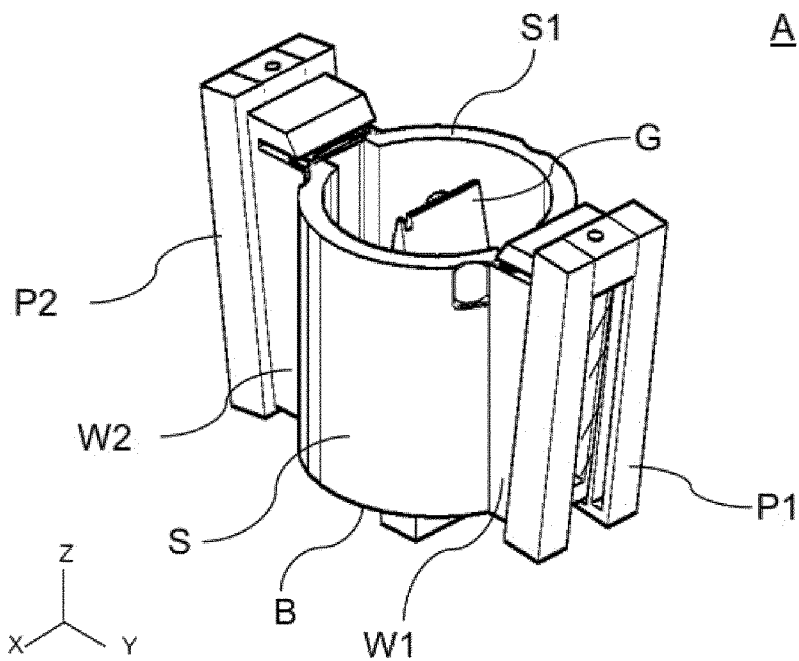
FIG. 2A illustrates the assembly in perspective view of the chamber of FIG. 1.
Figure 2B:
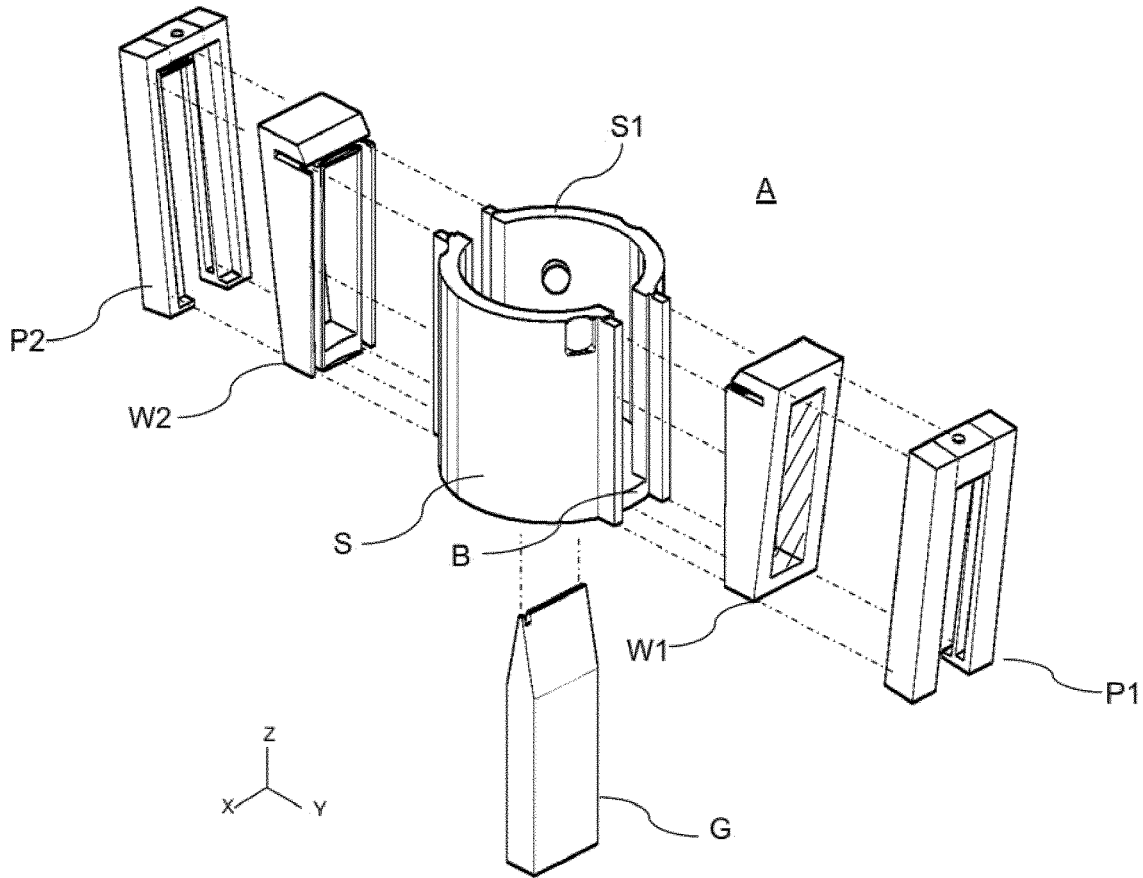
FIG. 2B shows an exploded perspective view of the chamber of FIG. 1.

Chamber A is depicted in perspective view in FIG. 2A. Chamber A comprises seven parts, namely a side wall S, a bottom wall B, a first window W1, a second window W2, a first nozzle P1, a second nozzle P2 and a feeding duct G. Said parts can be coupled together and are designed so as to form a closed chamber when it is coupled to the sample holder. The assembled chamber is shown in FIG. 2A and an exploded view is shown in FIG. 2B. The chamber can be adapted to the spectroscopic source by easily removing and changing the windows W1 and W2. Connections between parts W1, W2, P1, P2 and S of the chamber are realized by a sliding or a fitting coupling structure. Chamber A is closed by coupling the chamber A on the sample holder 4. As shown in FIG. 15 to FIG. 19, the coupling of the chamber A to the sample holder 4 may be ensured by a fastening groove 24 in the top side of the frame of the first W1 and second windows W2 that is adapted to engage in a sliding coupling structure with a corresponding fastening groove in the sample holder 4 (not shown).

The sample 14 is placed in the sample holder 4 which comprises a membrane 15 that is permeable to X-rays. An X-ray source 10 is installed so as to direct an incident X-ray beam 9 from underneath the sample holder 4 toward the sample holder membrane 15 and a scattered X-ray beam 2 is collected by the X-ray detector 1 installed underneath the sample holder 4. The incident X-ray beam 9 enters the chamber A through a first opening obturated by a first window W1. The scattered X-ray beam 2 exits the chamber A through a second opening obturated by a second window W2.

Figure 10:
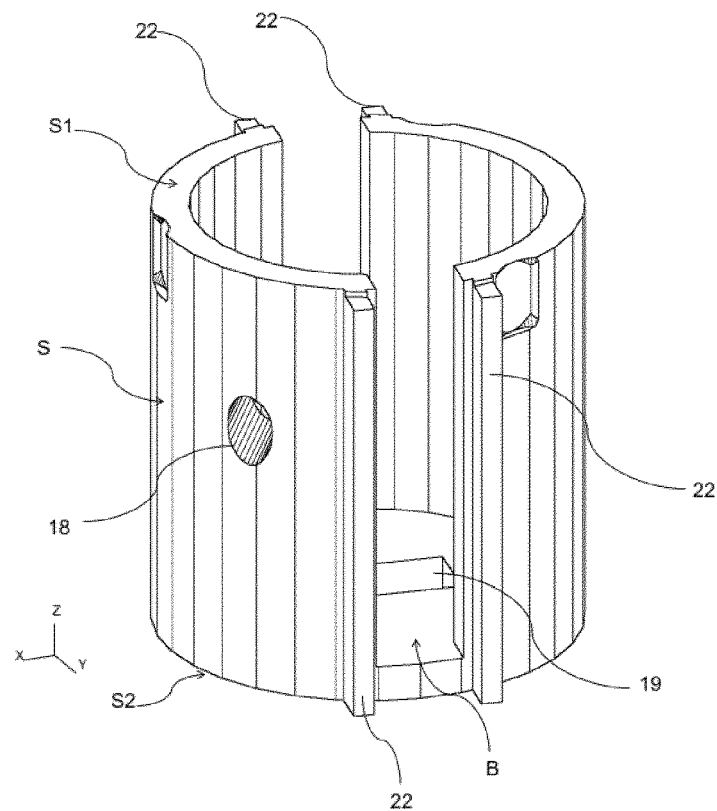
FIGS. 10-14 respectively show a perspective view, a front view, a left view, a top view and a bottom view of the side wall and bottom wall of the chamber of FIG. 1.
Figure 11:
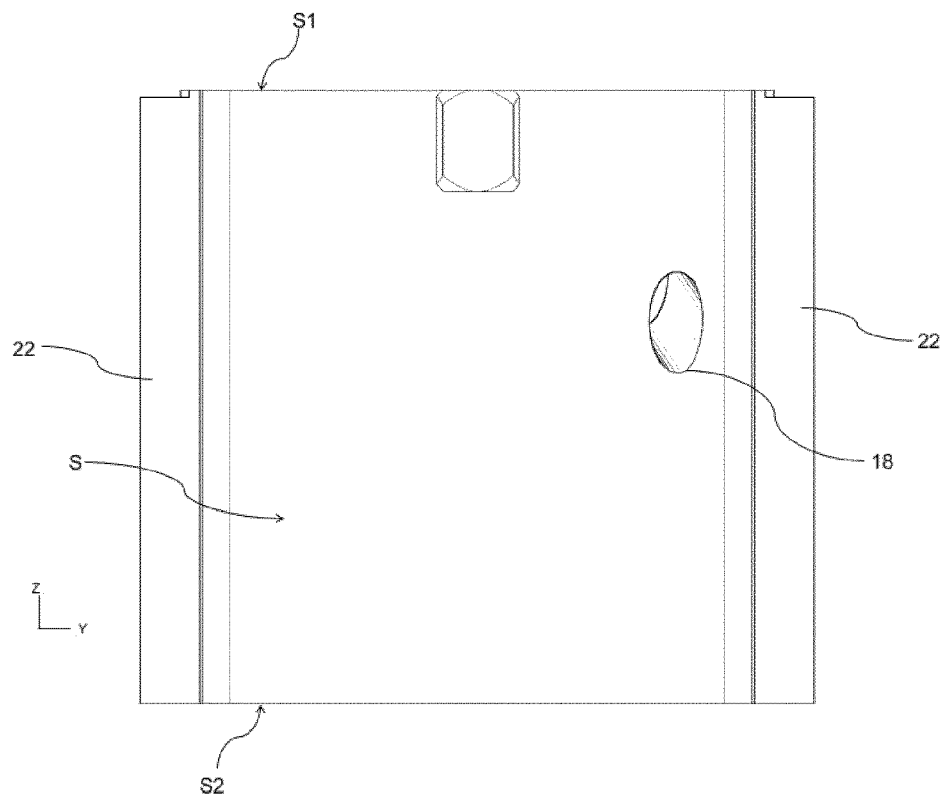
Figure 12:
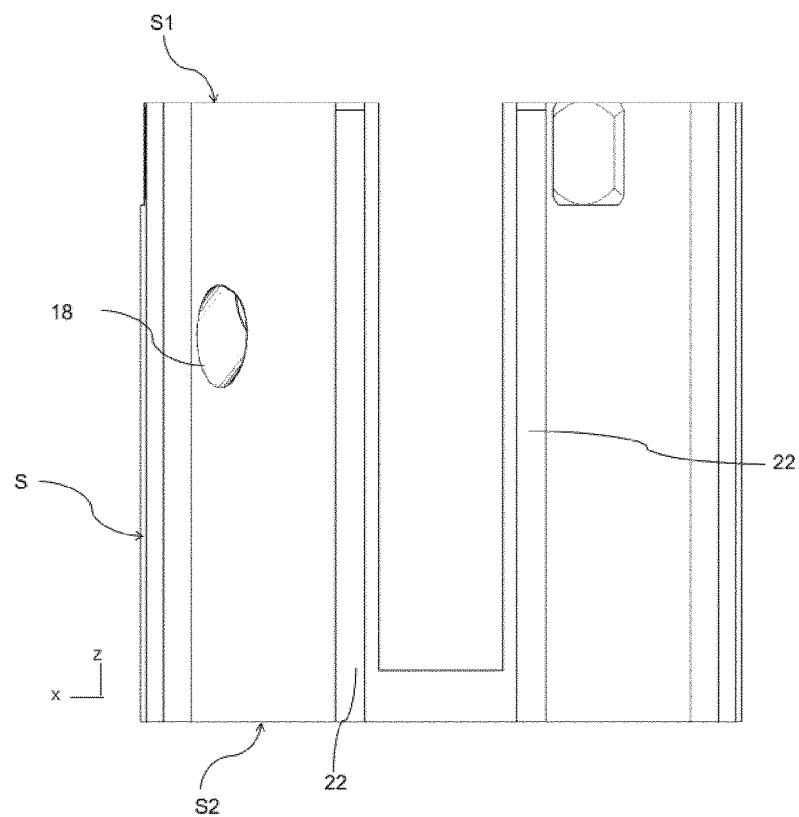
Figure 13:
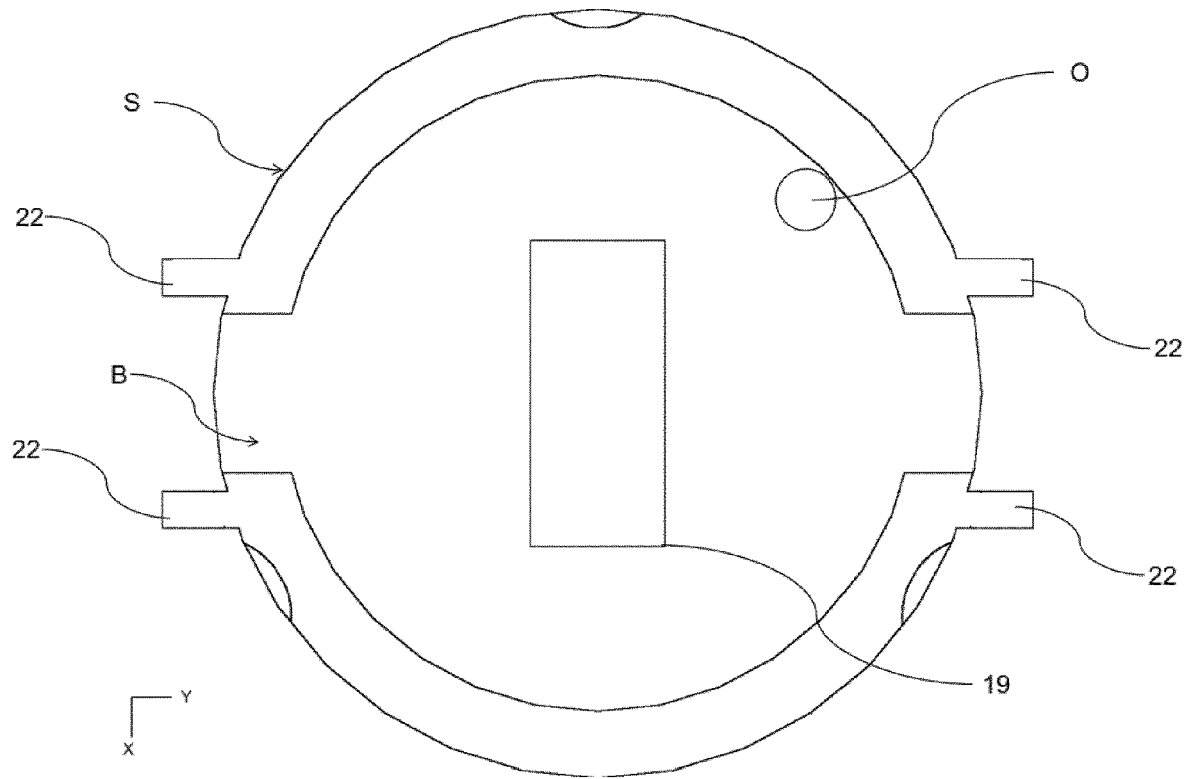
Figure 14:
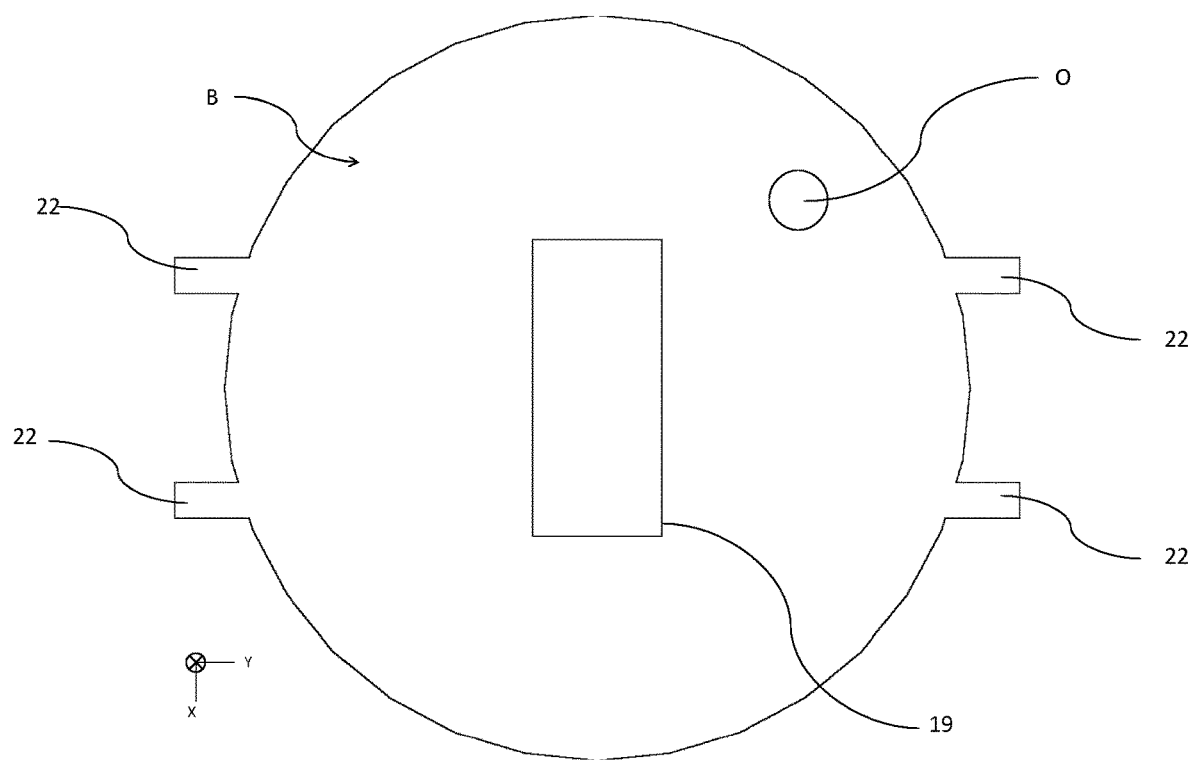

A dry gas thermostatically controlled to the same temperature as that of the sample holder is delivered in the chamber by the feeding duct G of the chamber. As shown in FIGS. 10, 13 and 14, the feeding duct G is inserted in the bottom wall B of the chamber via opening 19. The feeding duct G is further detailed in FIGS. 3A to 9. The feeding duct G comprises a top end 16a and a base 16b. The feeding duct G further comprises an inner channel 16c which comprises an enlargement 16d at the top end 16a of the feeding duct. The thermostatically controlled dry gas enters the feeding duct through the base 16b, moves upward via the inner channel 16c and enlargement 16d and exits through the top end 16a of the feeding duct. The top end 16a is located in close vicinity of the sample holder membrane 15 so that the thermostatically controlled dry gas is projected on the sample holder membrane 15 and maintains a thermostatically controlled dry gas atmosphere 11 in the chamber. The feeding duct G is connected to the temperature-controlled dry gas generator 12 via a gas tube connection 11a. The temperature-controlled dry gas generator 12 is connected to computer 13 which controls the temperature of the dry gas according to the temperature in the sample holder 4.

When the spectroscopic analysis is carried out in sub-ambient temperature conditions, a gas at ambient temperature is delivered on the outside of the first window W1 by the first nozzle P1 and a gas at ambient temperature is delivered on the outside of the second window W2 by the second nozzle P2. The gas is delivered to the first nozzle P1 and the second nozzle P2 via a gas tube 7 which is connected to the gas inlet 26 and the flow of gas is regulated with a gas flow controller 8. The gas flow controller 8 is connected to computer 13 which controls the flow of the gas according to the temperature in the chamber. For example, the gas flow controller 8 may be a solenoid valve, in particular available from Bronkhorst company under the brand name Mass-Stream™ D-6251DR.

The sample holder 4 comprises a side wall 4a and a bottom wall 4b. At least one part of the bottom wall 4b of the sample holder is flat and comprises a membrane 15 that is permeable to X-rays. The sample holder 4 further comprises a temperature probe 5 to measure the temperature in the sample holder. The sample holder 4 also comprises a double jacket 6, a heat-transfer fluid inlet port 6a and a heat-transfer outlet port 6b allowing the circulation of a heat-transfer fluid so as to control the temperature in the sample holder 4.

The chamber A comprises a side wall S and a bottom wall B. The side wall S of the chamber comprises a top end S1 and a bottom end S2. The chamber is cylindrical and is obtained by 3-D printing. The chamber is made of polylactic acid (PLA).

The chamber A is removably coupled to the sample holder 4 so as to form a closed chamber. As such, the chamber A is disposed beneath the sample holder 4 and the top end S1 of the side wall of the chamber is in contact with the sample holder 4. The coupling between the sample holder and the chamber is obtained by engaging the chamber A in a sliding coupling structure with the sample holder 4.

The chamber A comprises a first opening to deliver an incident X-ray beam 9 to the membrane 15 of the sample holder. The first opening is disposed so as to create an optical path between the X-ray source 10 and the membrane 15 of the sample holder. The dimensions of the first opening are adapted to deliver the incident X-ray beam 9 to the membrane 15 of the sample holder between −0.5 degrees and −70 degrees, in particular from −3 degrees to −50 degrees, in terms of a 2 Theta angular scale.

Figure 15:
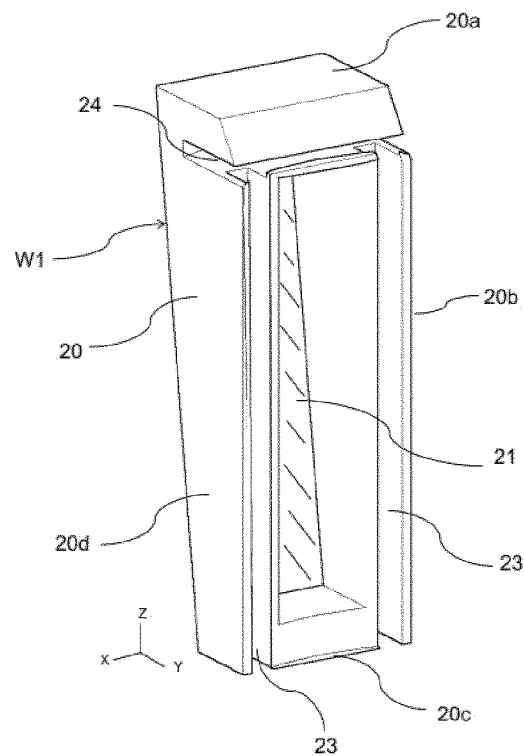
Figure 16:
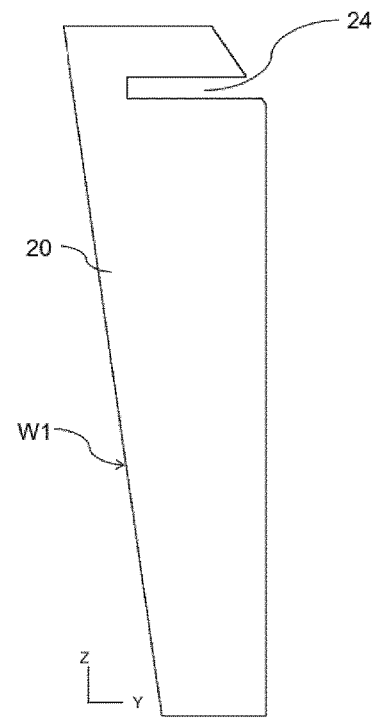
Figure 20:
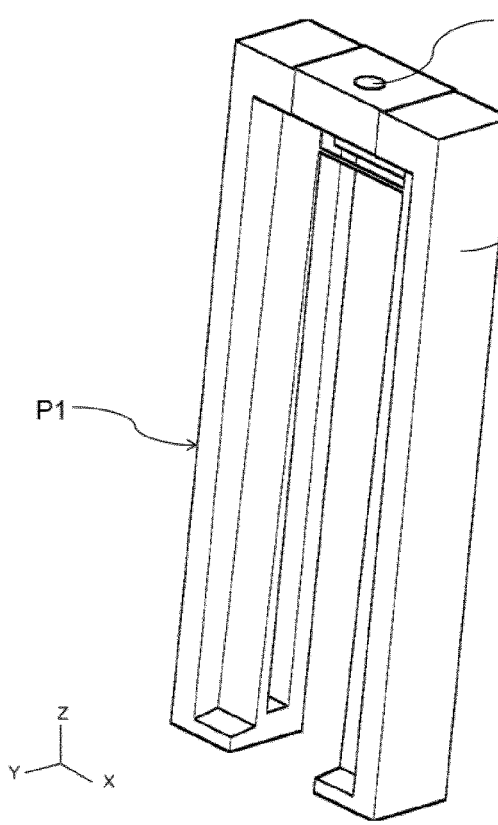
FIGS. 20-25 respectively show a perspective view, a front view, a bottom view, a top view, a right view and a left view of the first nozzle or the second nozzle of the chamber of FIG. 1.
Figure 21:
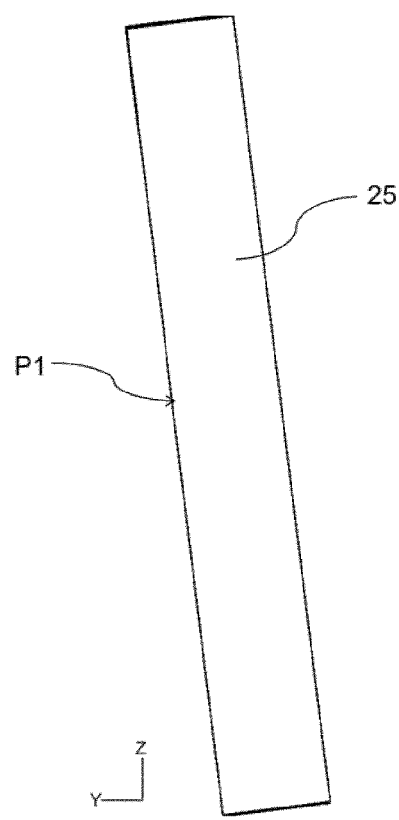
Figure 22:
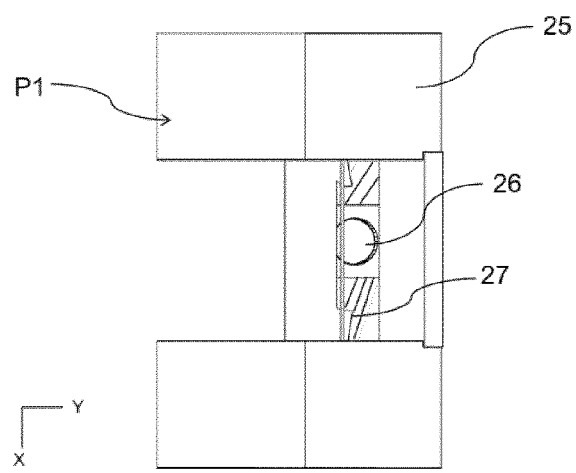
Figure 23:
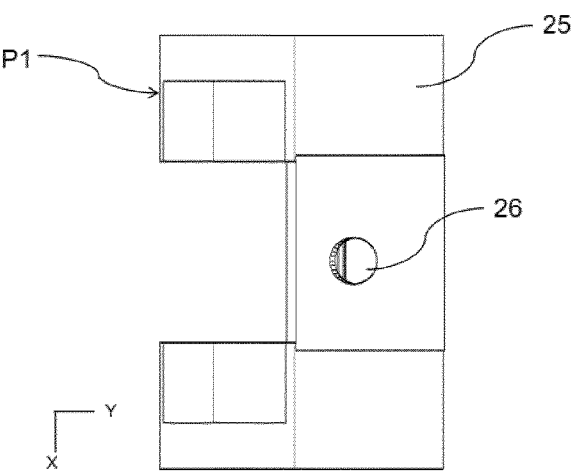
Figures 24, 25:
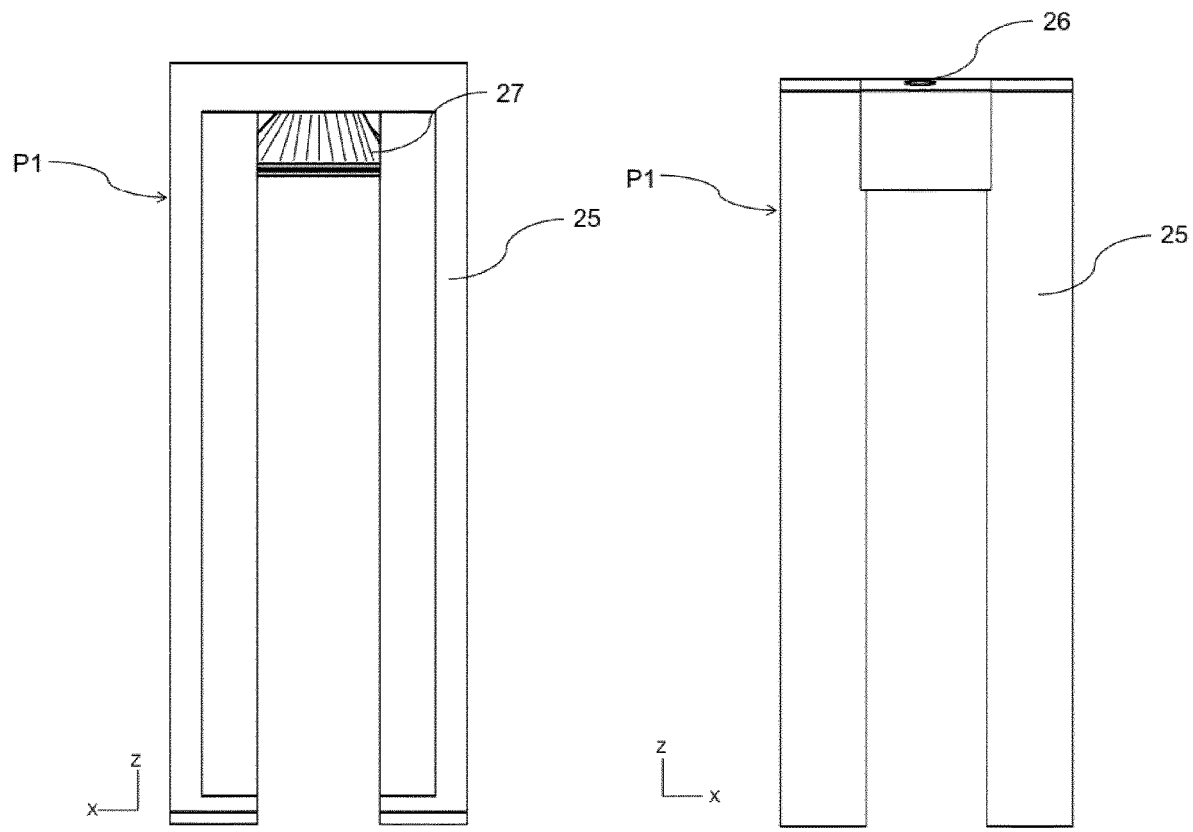

The first opening is obturated by a first window W1 that comprises a frame 20 and a membrane 21 that is permeable to X-rays. The membrane 21 is maintained to the frame 20 by a double-face adhesive. The first window W1 is removably coupled to the side wall S of the chamber so as to form a closed chamber. As shown in FIGS. 15 and 17, frame 20 of the first window comprises a top side 20a, a right side 20b, a bottom side 20c and a left side 20d. The coupling between the first window W1 and the side wall S of the chamber is obtained by engaging the frame 20 of the first window with the side wall S of the chamber in a sliding coupling structure. As such, the left side 20d and the right side 20b of the frame each comprise a fastening groove 23 and the side wall S of the chamber comprises two fastening protrusions 22 (shown on FIGS. 10-14) that are slid in the fastening grooves 23 of the frame of the first window. Further, the first window W1 is removably coupled to the sample holder 4 so as to form a closed chamber. The coupling between the first window W1 and the sample holder 4 is obtained by engaging the frame 20 of the first window in a sliding coupling structure with the sample holder 4. As such, the top side 20a of the frame comprises a fastening groove 24 and the sample holder comprises a fastening protrusion (not shown) that is slid in the fastening groove 24 of the frame of the first window.

The chamber A comprises a second opening for collecting the scattered X-ray beam 2 from the chamber. The second opening is disposed so as to create an optical path between the membrane of the sample holder 15 and the X-ray detector 1. The dimensions of the second opening are adapted to deliver the scattered X-ray beam 2 to the X-ray detector 1 between −0.5 degrees and −70 degrees, in particular from −3 degrees to −50 degrees, in terms of a 2 Theta angular scale.

The second opening is obturated by a second window W2 that comprises a frame 20 and a membrane 21 that is permeable to X-rays. The membrane 21 is maintained to the frame 20 by a double-face adhesive. The second window W2 is removably coupled to the side wall S of the chamber so as to form a closed chamber as described herein above for the first window W1. Further, the second window W2 is removably coupled to the sample holder 4 so as to form a closed chamber as described herein above for the first window W1.

The chamber A comprises a feeding duct G for introducing a thermostatically controlled dry gas in the chamber and an output O for evacuating said dry gas from the chamber. The output may be placed on the bottom wall of the chamber; the position of the output forcing the thermostatically controlled dry gas to travel through the chamber. Said output O may be a valve set to adjust the pressure inside the chamber slightly above the ambient pressure (1.01 to 1.05 atm). The feeding duct G is inserted in the chamber A through an opening 19 in the bottom wall B of the chamber. The feeding duct G is connected to a temperature-controlled dry gas generator 12. The temperature-controlled dry gas generator 12 is able to produce a dry gas and to adjust its temperature to a value or a series of values, in particular to set a constant temperature (isothermal mode) and/or to apply a temperature ramp (polythermal mode). The feeding duct G is connected to the temperature-controlled dry gas generator 12 via a tube 11a, such as a vacuum insulated line. The fluid introduced in the chamber A has the same temperature as that measured in the sample holder 4.

The feeding duct G comprises a base 16b and a top end 16a and the top end 16a is positioned in close vicinity of the membrane 15 of the sample holder. The feeding duct G is centered on the sample 14 to be analyzed. The base 16b and the top end 16a of the feeding duct have a rectangular cross-section, where the cross-section is a rectangle having a length l and a width w and the length is the side having the longest dimension. The cross-sectional area of the top end 16a is less than the cross-sectional area of the base 16b. The length $l_b$ of the base and the length $l_a$ of the top end are the same but the width $w_a$ of the top end is less than the width $w_b$ of the base. The feeding duct G is designed to not interfere with the incident X-ray beam 9. Further, the width $w_a$ of the top end of the feeding duct is placed in a direction parallel to the incident X-ray beam 9 (i.e. in direction y in the Figures) and the width $w_a$ of the top end of the feeding duct is relatively thin, for example from 0.01 to 1 cm. As such, the feeding duct G limits specular diffusion of the incident X-ray beam 9, in particular when the angle of the incident X-ray beam 9 with respect to the horizontal is low and is therefore adapted to be used as a knife-edge.

The feeding duct G comprises an inner channel 16c. The inner channel 16c is used to deliver the thermostatically controlled dry gas to the chamber. Further, the inner channel 16c comprises an enlargement 16d at the top end 16a of the feeding duct.

The chamber comprises a temperature probe 3 to measure the temperature in the chamber A. The temperature probe 3 of the chamber communicates the temperature in the chamber A to a system able to adjust the temperature in the chamber, namely a temperature-controlled dry gas generator 12, for example with a feedback loop. The temperature probe 3 of the chamber is disposed so as to measure the temperature in close vicinity of the sample membrane 15. The temperature probe 3 of the chamber is maintained by the feeding duct G. As such, the feeding duct G comprises a temperature probe channel 17 in which the temperature probe is inserted. the temperature probe in inserted through a temperature probe channel input 17b in the base 16b of the feeding duct and the top end 16a of the feeding duct comprises a recess 17a to house the temperature probing end of the probe 3. The temperature probe 3 may be a Pt100 or a Pt1000 temperature probe.

The chamber further comprises a first nozzle P1 to project a gas on the outside of the first window W1 and a second nozzle P2 to project a gas on the outside of the second window W1. The first nozzle P1 is removably coupled to the outside of the first window W1 and the second nozzle P2 is removably coupled to the outside of the second window W2. The first nozzle P1 and the second nozzle P2 comprise a frame 25 that is removably coupled to the frame 20 of the first or second window, a gas inlet 26 and a nozzle head 27.

The coupling between the first nozzle P1 and the first window W1 and the coupling between the second nozzle P2 and the second window W2 is obtained by engaging the frame 20 of the first window, respectively the frame 20 of the second window, in a fitting coupling structure with the frame 25 of the first nozzle, respectively the frame 25 of the second nozzle, as described herein above.

The chamber further comprises a third opening 18 for introducing a camera in the chamber. The third opening is an inclined through-hole in the side wall S of the chamber so as to have the sample 14 in the field of view of the camera.

The device further comprises a computer 13 to adjust the temperature in the chamber A according to the temperature in the sample holder 4. The computer 13 is connected to the temperature probe 3 in the chamber, to the temperature probe 5 in the sample holder and to the temperature-controlled dry gas generator 12 that controls the temperature of the dry gas delivered inside the chamber A. The computer 13 is further connected to the gas flow controller 8 that controls the flow of gas delivered to the outside of the first window W1 and second window W2 by the first nozzle P1 and the second nozzle P2.

The device further comprises an X-ray source 10 and an X-ray detector 1. The X-ray source 10 is a diffractometer provided with a goniometer installed so as to direct an incident X-ray beam 9 from underneath the sample holder 4 toward the sample holder membrane 15 and the X-ray detector 1 is installed underneath the sample holder 4 so as to measure the scattered X-ray beam 2.

In accordance with the exemplary first aspect of the invention, the chamber described for X-ray measurements can be adapted to other spectroscopic measurements such as infrared, TR-SHG, etc. . . . .

Figure 30:
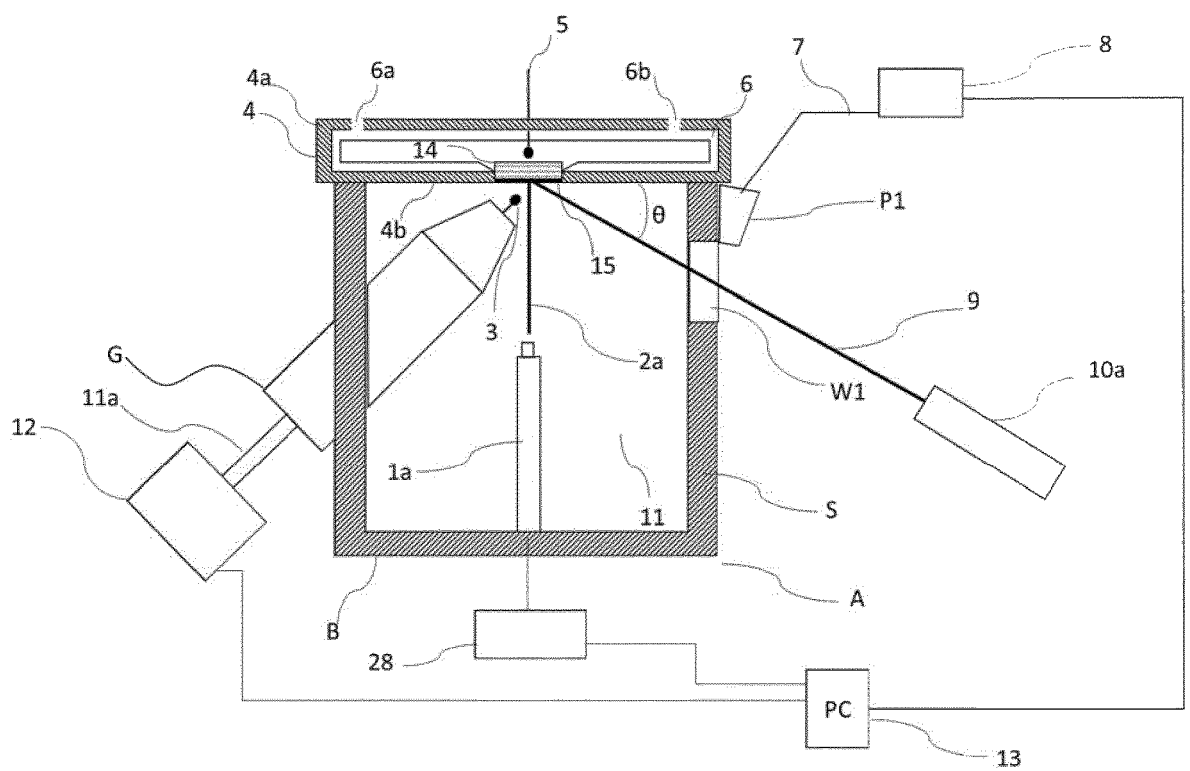
FIG. 30 represents an overall diagrammatic view of the device according to one embodiment of the invention (SHG measurements).

The diagrammatic view of FIG. 30 shows an embodiment of a device according to one embodiment of the invention for measuring Second Harmonic Generation measurements. The device of FIG. 30 is identical to that of FIG. 1 except that the X-ray source 10 is replaced by an infrared laser source 10a, the scattered X-ray beam 2 is replaced by a scattered second harmonic beam 2a, and the X-ray detector 1 is replaced with an optical fiber probe 1a. In this embodiment, the first opening is obturated by a first window W1 that comprises a membrane 21 that is permeable to pulsed laser beams and the sample holder membrane 15 is permeable to pulsed laser beams. The chamber comprises a second opening which is obturated by the optical fiber probe 1a. The optical fiber probe 1a collects the second harmonic signal generated by the sample (diffused light) and directs it towards a spectrometer 28.

The present invention is further detailed in the non-limiting examples below.

EXAMPLES

In the examples, the following materials and methods are used:

The parts of the chamber are made of PLA, were modeled using Blender ver.2.76 software and 3D-printed using a 3D-printer provided the company Dagoma under the brand name DISCOEASY200®. The windows of the chamber were equipped with poly(ethyl benzene-1,4 dicarboxylate) membranes (available as Mylar® from Dupont) for XRD analyses. The windows of the chamber were equipped with fused silica membranes for Second Harmonic Generation (SHG) analyses (i.e. permeable to infrared (1064 nm) photons).

The X-ray source is marketed by Siemens company under brand name KFLCu2K399-689® and was positioned in a sheath marketed by Bruker company under brand name C79298-A3244-A4®.

The X-ray detector is a fast detector marketed by Bruker company under brand name LynxEye®.

The diffractometer as a whole is controlled by XRDCommander® software marketed by Bruker company.

The sample holder is a double-wall jacketed reactor thermostated by cryostat marketed by LAUDA company under reference RP890C. The regulation was carried out on the internal temperature of the cryostat.

The temperature of the chamber was regulated by a temperature-controlled gas stream provided by KGW company under brand name Kaltgas®.

The camera in the chamber is provided by Supereyes company under brand name Supereyes®.

The infrared source is a Nd:YAG Q-switched laser (provided by Ekspla company under brand name NL301HT-10AW®). The laser was operated at 1.06 µm and delivered up to 400 mJ pulses of 5 ns duration with a repetition rate of 10 Hz. A motorized energy adjustment device (provided by Ekspla company under brand name H300A1®) made up of two polarizers and two half-wave plates was used to adjust the incident energy. The energy was set at 30% (circa 120 mJ). The second harmonic signal generated by the sample (diffused light) was collected into an optical fiber (500 µm of core diameter) and directed onto the entrance slit of a spectrometer (provided by Ocean Optics company under the brand name QE65000®). A boxcar integrator allowed an average spectrum (spectral range 526-528 nm) with a resolution of 0.1 nm to be recorded over 3 s (30 pulses).

Example 1: Monitoring of n-Decane Crystals Behavior and their Melting 1 mL of n-decane was placed in the sample holder. The sample was purchased from Alfa Aesar with a purity of 99%.

Both the sample holder and the chamber were set at the same temperature. The analyses were carried out once the temperature given by the temperature probe of the chamber had stabilized at the desired temperature. X-ray diffraction analyses were performed between −3° and −40° in 2 Theta angular scale with intervals of 0.038°. The acquisition times were 0.5 seconds per step.

The liquid sample was placed in the sample holder at 20° C. and then cooled down −50° C. The sample was kept at this temperature until crystallization occurred. The crystallization of the sample was observed with a camera placed in the chamber.

Figure 26:
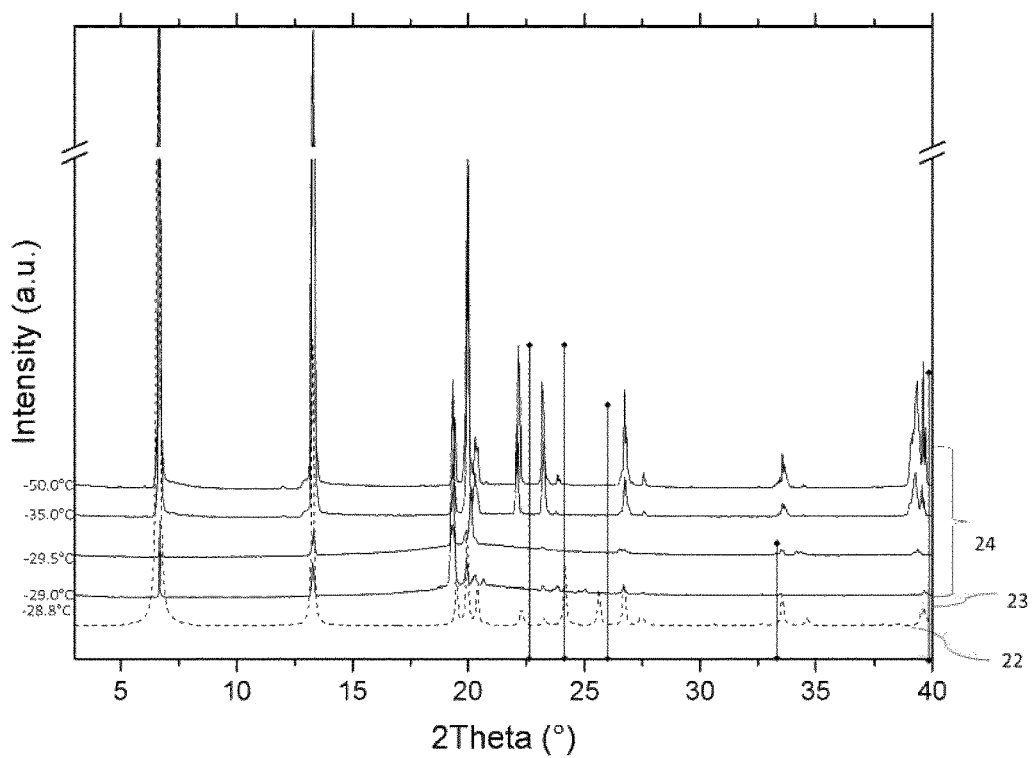
FIG. 26 represents diffractograms recorded during the heating of n-decane according to Example 1.

FIG. 26 shows diffractograms recorded during heating of the sample. The diffractograms obtained 24 are those of the n-decane known polymorph 22 with a strong preferential orientation of crystals along the (001) crystallographic plane of the crystal lattice. At a temperature of −28.8° C., no diffraction peak is visible on diffractogram 23 meaning that the sample is no longer crystalline. The melting of the sample was confirmed by camera observations. The fusion temperature is in agreement with the fusion temperature described in literature. Vertical lines in FIG. 26 represent the theoretical positions of the diffraction peaks of the hexagonal ice (ICE 1 Space group: $P6_3/mmc$). According to the diffractograms in FIG. 26, no ice formation was observed during the experiment.

Example 2: Monitoring of n-Octane Crystals Behavior and their Melting 1 mL of n-octane was introduced in the sample holder. The sample was purchased from Alfa Aesar with a purity of 98%.

Both the sample holder and the chamber were set at the same temperature. The analyses were carried out once the temperature given by the temperature probe of the chamber had stabilized at the desired temperature. X-ray diffraction analyses were performed between −5° and −40° in 2 Theta angular scale with intervals of 0.038°. The acquisition times were 0.5 seconds per step.

Figure 27:
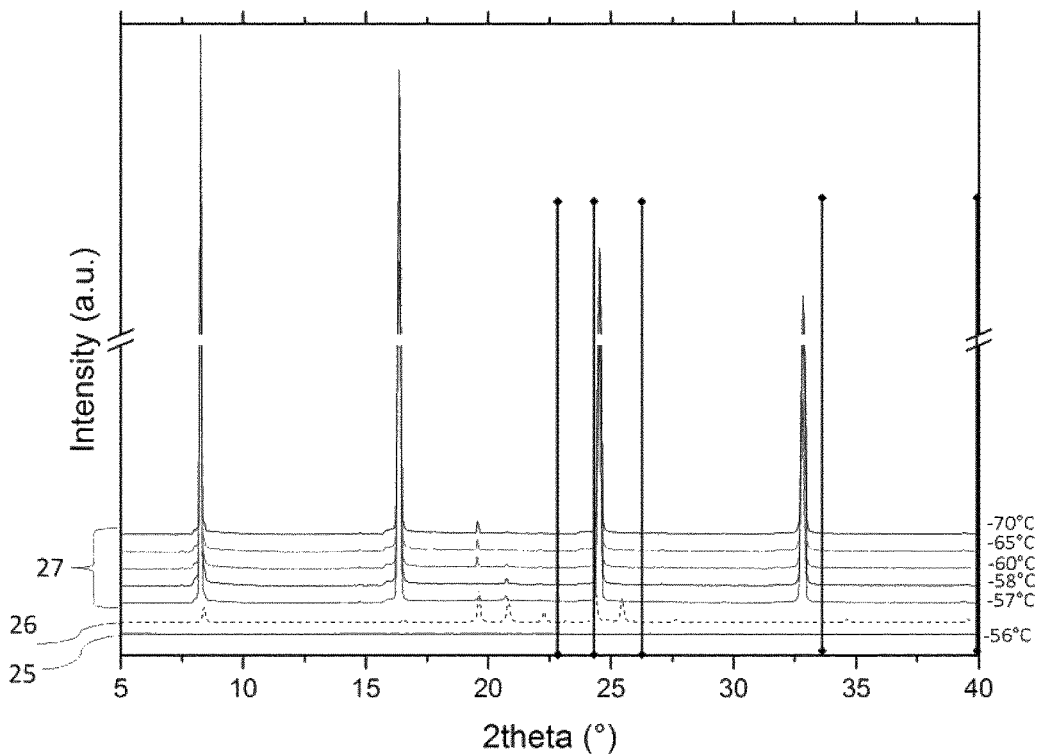
FIG. 27 represents diffractograms recorded during the heating of n-octane according to Example 2.

The liquid sample was placed in the sample holder at 20° C. and then cooled down −70° C. The sample was kept at this temperature until crystallization occurred. The crystallization of the sample was observed with a camera placed in the chamber FIG. 27 shows diffractograms recorded during heating of the sample. The diffractograms obtained 27 are those of the n-octane known polymorph 26 with a strong preferential orientation of crystals along the (001) crystallographic plane. At a temperature of −56.0° C., no diffraction peak is visible on diffractogram 25 meaning that the sample is no longer crystalline. The melting of the sample was confirmed by camera observations. The fusion temperature is in agreement with fusion temperature described in literature at (i.e. −56.6° C.). Vertical lines in FIG. 27 represent the theoretical positions of the diffraction peaks of hexagonal ice (ICE 1 space group: $P6_3/mmc$). According to the diffractograms in FIG. 27, no ice formation was observed during the experiment.

Example 3: Monitoring of Ammonium Chloride Crystals Phase Transition

A suspension of 1 g of ammonium chloride in 35 mL of acetone was placed in the sample holder (ammonium chloride is not soluble in acetone). The ammonium chloride was purchased from Prolabo with a purity of 98% and the acetone from Sigma Aldrich with a purity of 99.9%. The suspension was continuously stirred at 50 rpm.

Both the sample holder and the chamber were set at the same temperature. The analyses were carried out once the temperature given by the temperature probe of the chamber had stabilized at the desired temperature. Second Harmonic Generation (SHG) analyses were performed between 526 nm and 538 nm. The acquisition time was 3 seconds per spectrum. It is worth of note to recall that SHG signal should appear at the half of the incident laser wavelength (i.e. 532 nm) only if the crystal structure is non-centrosymmetric. In the case of centrosymmetric crystal structure, the intensity of the second harmonic generation is null. X-ray diffraction analyses were performed between −5° and −40° in 2 Theta angular scale with intervals of 0.038°. The acquisition times were 0.5 seconds per step.

The sample was placed in the sample holder at 20° C. and then cooled down −40° C. The sample was kept at this temperature during 20 min before heating and recording of SHG signal on the one hand and XRPD patterns on the other hand.

Figure 28:
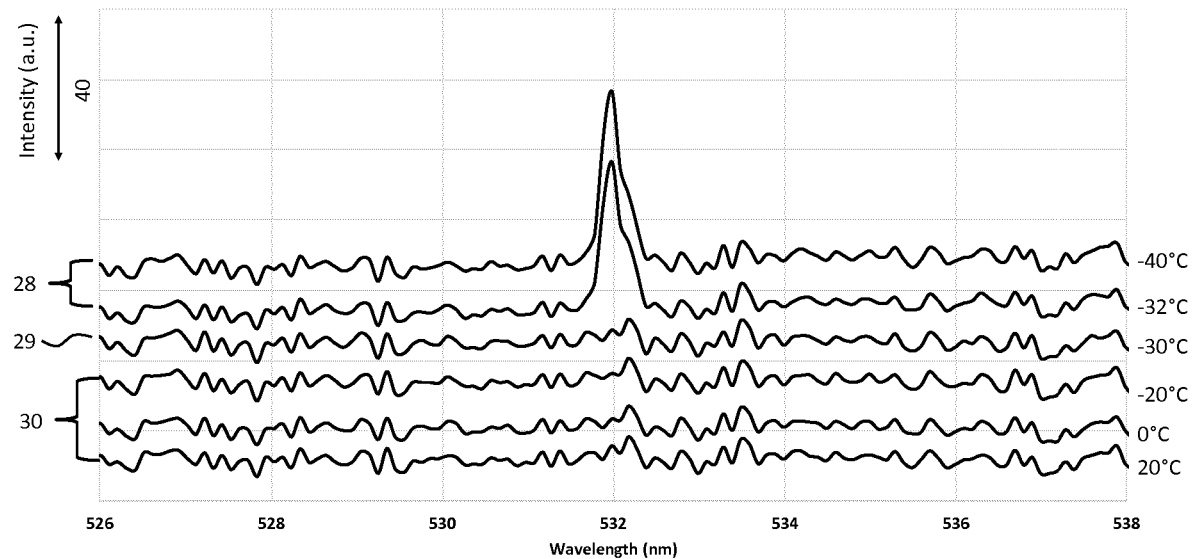
FIG. 28 represents the SHG intensity vs temperature recorded during heating from −40° C. to +20° C. of ammonium chloride in suspension in acetone according to Example 3.

FIG. 28 shows SHG spectra recorded during heating of the sample. Spectra 28 are those of the low temperature (LT) known polymorph (non-centrosymmetric crystal). The SHG signal intensity was calculated at 48 counts and 47 counts at −40° C. and −32° C., respectively. At −30° C., no peak is visible on the spectrum 29 meaning that the sample is no longer non-centrosymmetric (i.e. a polymorphic transition occurred). On spectra 30 no peak is visible meaning the crystal structure remains centrosymmetric from −30° C. to room temperature. According to SHG spectra, the polymorphic transition temperature can be estimated between −32° C. and −30° C. The polymorphic temperature of transition is in agreement with that described in literature (E Mohler and R Pitka, "Piezoelectric Properties of $NH_4Cl$ Near Its Order-Disorder Phase Transition," *Solid State Communications* 14 (1974): 791-94, doi: 10.1016/0038-1098(74)90887-4).

Figure 29:
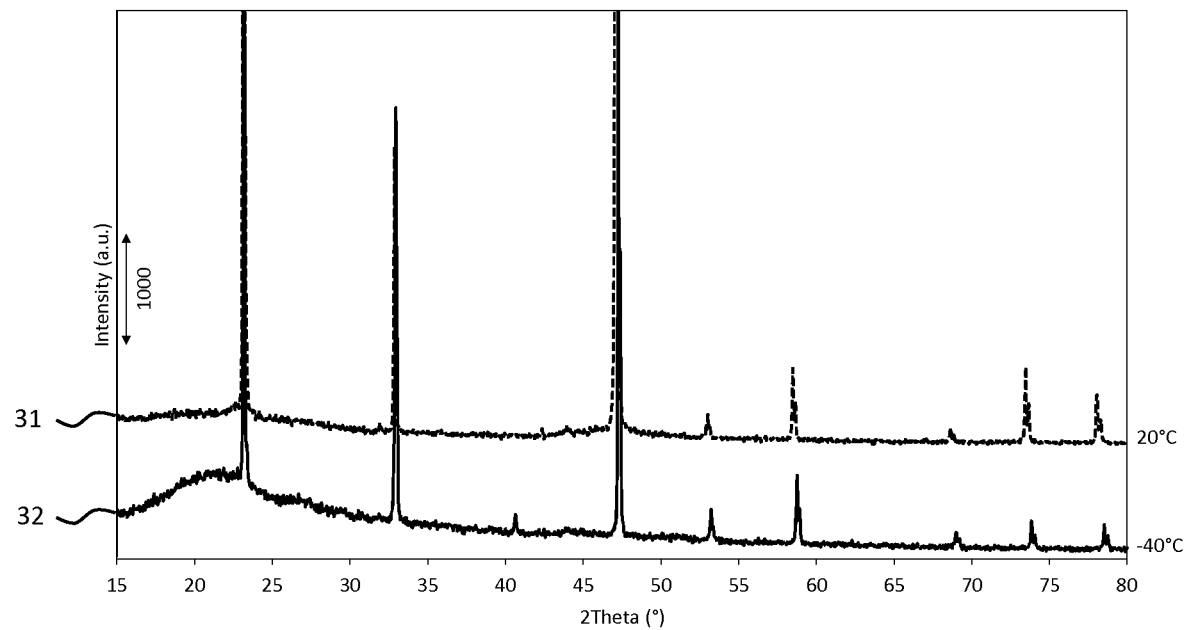
FIG. 29 represents XRPD patterns recorded during heating from −40° C. to +20° C. of ammonium chloride in suspension in acetone according to Example 3.

FIG. 29 shows XRPD patterns recorded during heating of the suspension. Diffractograms 31 and 32 are those of the ammonium chloride known polymorphs. Because of the close similarity between both ammonium chloride polymorphs (both crystallizing in cubic space groups), the X-ray diffraction patterns of LT and RT forms cannot be clearly distinguished contrary to SHG spectra. In this case, temperature-resolved SHG measurements can clearly differentiate both polymorphs.

In the examples, when the device did not comprise the chamber, hexagonal ice crystals appeared on the membrane of the sample holder. The amount of ice, increasing all along the experiment, leads to a total absorption of the incident beam, making impossible to conduct any measurement on the sample.

It is deduced therefrom that the device of the invention can be used for X-ray diffraction and Second Harmonic Generation measurements at low temperature, for example as low as −70° C., without formation of ice during the experiment. The chamber also enhances temperature regulation by reducing the temperature gradient inside the sample holder.

The invention claimed is:

1. A device for spectroscopic measurement comprising a sample holder and a chamber;
   wherein the sample holder comprises a side wall, a bottom wall and a temperature control system to control the temperature in the sample holder;
   part of the bottom wall of the sample holder is flat and comprises a membrane that is permeable to spectroscopic radiation;
   the chamber comprises a side wall and a bottom wall and is removably coupled to the sample holder;
   the chamber comprises a first opening to deliver an incident spectroscopic beam to the membrane of the sample holder;

the chamber comprises a feeding duct for introducing a fluid in the chamber and an output for evacuating the fluid from the chamber;

the sample holder comprises a probe to measure the temperature in the sample holder, the chamber comprises a probe to measure the temperature in the chamber and the device comprises a system to adjust the temperature in the chamber according to the temperature in the sample holder.

2. The device as claimed in claim 1, wherein the first opening is obturated by a first window that comprises a frame and a membrane that is permeable to spectroscopic radiation, in particular a membrane that is permeable to X-rays or to pulsed laser beams for second harmonic generation; or the first opening is obturated by a first waveguide, in particular a first infrared waveguide.

3. The device as claimed in claim 1, wherein the chamber comprises a second opening for collecting a reflected spectroscopic beam from the chamber.

4. The device as claimed in claim 3, wherein the second opening is obturated by a second window that comprises a frame and a membrane that is permeable to spectroscopic radiation, in particular a membrane that is permeable to X-rays; or the second opening is obturated by a second waveguide, in particular a second infrared waveguide.

5. The device as claimed in claim 1, wherein the membrane of the sample holder is permeable to X-rays, infrared radiation, or pulsed laser beams for second harmonic generation.

6. The device as claimed in claim 2, wherein the chamber further comprises a first nozzle to project a fluid on the outside of the first window or on a part of the first waveguide that is outside the chamber.

7. The device as claimed in claim 1, wherein the chamber further comprises a second opening obturated by a second window, and a second nozzle to project a fluid on the outside of the second window or on a part of the second waveguide that is outside the chamber.

8. The device as claimed in claim 1, wherein the chamber further comprises a third opening for introducing a camera or a microscope in the chamber.

9. The device as claimed in claim 1, wherein the feeding duct comprises a base and a top end and said top end is positioned in close vicinity of the membrane of the sample holder; in particular, the base and the top end of the feeding duct have a rectangular cross-section; more particularly a cross-sectional area of the top end of the feeding duct is less than a cross sectional area of the base of the feeding duct.

10. A method of spectroscopic measurement with the device defined in claim 1, wherein a compound to be analyzed is installed in the sample holder, a spectroscopic analysis is undertaken by delivering an incident spectroscopic beam upwards to the membrane of the sample holder through the first opening of the chamber and by measuring the emergent spectroscopic beam, and a fluid thermostatically controlled to the same temperature as that of the sample holder is delivered in the chamber by the internal duct of the chamber.

11. The method of claim 10, wherein the temperature of the sample holder during the spectroscopic analysis reaches a temperature lower than the temperature outside of the device, in particular the temperature of the sample holder during the spectroscopic analysis is set to reach a value or a series of values within the range of −100° C. to 10° C., more particularly within the range of −90° C. to 0° C.

12. The method of claim 10, wherein the fluid delivered in the chamber is a gas, in particular a dry gas, more particularly dry nitrogen or dry carbon dioxide.

13. The method of claim 10, wherein the first opening of the chamber is obturated by a first window or a first waveguide and a fluid is delivered to the outside of the first window or to a part of the first waveguide that is outside the chamber by a first nozzle, the temperature of said fluid being at a temperature higher than the temperature in the chamber, in particular from 5 to 50° C., more particularly a fluid having a temperature higher than the dew point of the air outside the device.

14. The method of claim 10, wherein the second opening of the chamber is obturated by a second window or a second waveguide and a fluid is delivered to the outside of the second window or to a part of the second waveguide that is outside the chamber by a second nozzle, the temperature of said fluid being at a temperature higher than the temperature in the chamber, in particular from 5 to 50° C., more particularly a fluid having a temperature higher than the dew point of the air outside the device.

15. The method of claim 10, wherein the spectroscopic analysis is an X-ray diffraction analysis, a temperature-resolved second harmonic generation analysis and/or an infrared analysis.

* * * * *